US008782539B2

(12) United States Patent
Bump et al.

(10) Patent No.: US 8,782,539 B2
(45) Date of Patent: Jul. 15, 2014

(54) GENERIC UTILITY SUPPORTING ON-DEMAND CREATION OF CUSTOMIZABLE GRAPHICAL USER INTERFACES FOR VIEWING AND SPECIFYING FIELD DEVICE PARAMETERS

(75) Inventors: Scott S. Bump, Franklin, MA (US); Richard L. Linscott, Plainville, MA (US); Nestor J. Camino, Jr., Hingham, MA (US); Vladimir Kostadinov, Sharon, MA (US); Charles W. Piper, Foxboro, MA (US); Johan I. Tegnell, Mansfield, MA (US)

(73) Assignee: Invensys Systems, Inc., Foxboro, MA (US)

( * ) Notice: Subject to any disclaimer, the term of this patent is extended or adjusted under 35 U.S.C. 154(b) by 2565 days.

(21) Appl. No.: 11/244,860

(22) Filed: Oct. 5, 2005

(65) Prior Publication Data

US 2007/0075916 A1    Apr. 5, 2007

(51) Int. Cl.
*G06F 3/00* (2006.01)
(52) U.S. Cl.
USPC ............................................................ 715/762
(58) Field of Classification Search
USPC ................................... 715/762; 345/3.1, 520
See application file for complete search history.

(56) References Cited

U.S. PATENT DOCUMENTS

| 5,442,639 | A | * | 8/1995 | Crowder et al. | 714/712 |
|---|---|---|---|---|---|
| 5,617,522 | A | | 4/1997 | Peltier | |
| 5,812,394 | A | * | 9/1998 | Lewis et al. | 700/17 |
| 6,295,874 | B1 | * | 10/2001 | Strutt et al. | 73/597 |
| 6,342,907 | B1 | | 1/2002 | Petty et al. | |
| 6,556,219 | B1 | * | 4/2003 | Wugofski | 715/762 |
| 6,754,885 | B1 | | 6/2004 | Dardinski et al. | |
| 7,640,007 | B2 | * | 12/2009 | Chen et al. | 455/414.1 |
| 2004/0085348 | A1 | * | 5/2004 | Wang | 345/735 |
| 2005/0123884 | A1 | * | 6/2005 | Walls et al. | 434/118 |
| 2006/0206866 | A1 | * | 9/2006 | Eldrige et al. | 717/122 |
| 2007/0016896 | A1 | * | 1/2007 | Wittmer et al. | 717/140 |

OTHER PUBLICATIONS

International Search Report and Written Opinion for PCT/US07/66394 dated Jul. 7, 2008.

\* cited by examiner

*Primary Examiner* — Stephen Alvesteffer
(74) *Attorney, Agent, or Firm* — Edward S. Jarmolowicz, Esq.

(57) ABSTRACT

A universal device type manager (DTM) utility is described herein including a generalized architecture facilitating defining and generating user interfaces associated with a variety of field device types. The utility includes a device description data store interface that provides access to a device description store wherein standard device descriptions (DD files) for a variety of field device types are maintained. No specialized customization is done to the device descriptions by the device or tool vendors. A device type template store interface provides access to a set of device type manager definitions. A device type manager engine renders, on-demand, a device type manager user interface providing user access to parameters and other information for a field device type/instance based upon: (1) a device description and (2) a device type manager definition.

23 Claims, 14 Drawing Sheets

| | FDT Type Editor: BA30 <Online> | | | | | | |
|---|---|---|---|---|---|---|---|
| | Actual: OOS Target: Auto | | OOS | Man | Cas | Notes | Help |
| | Identification | Configuration | Tuning | Watch | Diagnostics | Security | Methods |
| | Parameter Name | | | Value | | Units | Help |
| -1 | SRD991_RES1234567890123456789012 | | | | | | |
| 1 | MODE_BLK.Target | | | 0x80(128) OOS | | | Block Mode Target |
| 2 | BLOCK_ERROR | | | 0x40 (64) Out of Service | | | Block Error |
| 3 | MANUFACTURER_ID | | | 0x385884(3692676) Foxboro | | | Device Manufacturer |
| 4 | DEVICE_TYPE | | | 0x2401 (9217) | | | Device Type |
| 5 | DEVICE_REVISION | | | 0x10 (16) | | | Device Revision |
| 6 | DD REVISION | | | 0x02 (2) | | | Device Description Revision |
| -2 | TRANSDUCER | | | | | | |
| 1 | MODE_BLK.Target | | | 0x08(8) Auto | | | Block Mode Target |
| 2 | BLOCK_ERROR | | | 0x40 (64) Out of Service | | | Block Error |
| 3 | PRIMARY_VALUE.Status | | | 0x80(128) Good.NC.NoLimit | | | Primary Value status |
| 4 | PRIMARY_VALUE.VALUE | | | 33.993 | | | Primary Value Value |
| 5 | SECONDARY_VALUE.Status | | | 0x40(63) Uncertain.NC.NoLimit | | | Secondary Value status |
| 6 | SECONDARY_VALUE.Value | | | 0.00001 | | | Secondary Value Value |
| -3 | AI_1007 | | | | | | |
| 1 | MODE_BLK.Target | | | 0x08(8) Auto | | | Block Mode Target |
| 2 | BLOCK_ERROR | | | 0x40 (64) Out of Service | | | Block Error |
| 3 | PRIMARY_VALUE.Status | | | 0x80(128) Good.NC.NoLimit | | | Primary Value status |
| 4 | PRIMARY_VALUE.VALUE | | | 33.993 | | | Primary Value Value |
| 5 | SECONDARY_VALUE.Status | | | 0x40(63) Uncertain.NC.NoLimit | | | Secondary Value status |
| 6 | SECONDARY_VALUE.Value | | | 0.00001 | | | Secondary Value Value |
| -3 | AI_1007 | | | | | | |
| 1 | MODE_BLK.Target | | | 0x08(8) Auto | | | Block Mode Target |
| 2 | BLOCK_ERROR | | | 0x40 (64) Out of Service | | | Block Error |
| 3 | PRIMARY_VALUE.Status | | | 0x80(128) Good.NC.NoLimit | | | Primary Value status |
| 4 | PRIMARY_VALUE.VALUE | | | 33.993 | | | Primary Value Value |
| 5 | SECONDARY_VALUE.Status | | | 0x40(63) Uncertain.NC.NoLimit | | | Secondary Value status |
| 6 | SECONDARY_VALUE.Value | | | 0.00001 | | | Secondary Value Value |

Tree (left panel):
- BA30
  - Identification
  - Diagnostics
  - SM
  - NM
  - RB
  - TB
  - AI_1
  - AI_2
  - PID
    - Identification
    - Configuration
    - Diagnostics
    - Compare
    - Other
    - Security Buttons: Save | Download | Download All | Upload All

| | FDT Type Editor: BA30:TB_1 <Online> | | | | | | | |
|---|---|---|---|---|---|---|---|---|
| | Actual: OOS Target: Auto | OOS | Man | Auto | Cas | | Notes | Help |
| | Identification │ Configuration │ Tuning │ Watch │ Diagnostics │ Security │ Methods | | | | | | | |

| | Parameter Name | Value | Units | Help |
|---|---|---|---|---|
| -1 | SRD991_RES12345678901234567890012 | | | |
| 1 | MODE_BLK.Target | 0x80(128) OOS | | Block Mode Target |
| 2 | BLOCK_ERROR | 0x40 (64) Out of Service | | Block Error |
| 3 | MANUFACTURER_ID | 0x385884(3692676) Foxboro | | Device Manufacturer |
| 4 | DEVICE_TYPE | 0x2401 (9217) | | Device Type |
| 5 | DEVICE_REVISION | 0x10 (16) | | Device Revision |
| 6 | DD REVISION | 0x02 (2) | | Device Description Revision |
| -2 | TRANSDUCER | | | |
| 1 | MODE_BLK.Target | 0x08(8) Auto | | Block Mode Target |
| 2 | BLOCK_ERROR | 0x40 (64) Out of Service | | Block Error |
| 3 | PRIMARY_VALUE.Status | 0x80(128) Good.NC.NoLimit | | Primary Value status |
| 4 | PRIMARY_VALUE.VALUE | 33.993 | | Primary Value Value |
| 5 | SECONDARY_VALUE.Status | 0x40(63) Uncertain.NC.NoLimit | | Secondary Value status |
| 6 | SECONDARY_VALUE.Value | 0.00001 | | Secondary Value Value |
| -3 | AI_1007 | | | |
| 1 | MODE_BLK.Target | 0x08(8) Auto | | Block Mode Target |
| 2 | BLOCK_ERROR | 0x40 (64) Out of Service | | Block Error |
| 3 | PRIMARY_VALUE.Status | 0x80(128) Good.NC.NoLimit | | Primary Value status |
| 4 | PRIMARY_VALUE.VALUE | 33.993 | | Primary Value Value |
| 5 | SECONDARY_VALUE.Status | 0x40(63) Uncertain.NC.NoLimit | | Secondary Value status |
| 6 | SECONDARY_VALUE.Value | 0.00001 | | Secondary Value Value |

Block Parameters     ● Watch     ○ Trend

| Time | Par 1 | Par 2 | Par 3 | Par 4 | Par 5 | Par 6 | Par 7 |
|---|---|---|---|---|---|---|---|
| 1:05:33 | 33.1 | inH2O | 200 | | | | |
| 1:05:43 | 33.6 | inH2O | 200 | | | | |
| 1:05:53 | 33.5 | inH2O | 200 | | | | |
| 1:05:03 | 33.4 | inH2O | 200 | | | | |
| 1:05:13 | 33.8 | inH2O | 200 | | | | |
| 1:05:23 | 32.0 | inH2O | 200 | | | | |
| 1:05:33 | 41.6 | PSI | 200 | | | | |

| Save | Download | Download All | Upload All |
|---|---|---|---|

FDT Type Editor: BA30:TB_1 <Online>

Tabs: Identification | Configuration | Tuning | OOS | Man | Auto | Cas | Watch | Diagnostics | Security | Methods Actual: OOS  Target: Auto

| # | Parameter Name | Observer | Operator | Maintenance | Planning Engineer |
|---|---|---|---|---|---|
| 1 | FF_BLOCK | Read & Write | Read & Write | Read & Write | Read & Write |
| 2 | ST_REV | Read | Read | Read | Read |
| 3 | TAG_DESC | Read & Write | Read & Write | Read & Write | Read & Write |
| 4 | STRATEGY | Read & Write | Read & Write | Read & Write | Read & Write |
| 5 | ALERT_KEY | Read & Write | Read & Write | Read & Write | Read & Write |
| 6 | MODE_BLK | Read & Write | Read & Write | Read & Write | Read & Write |

| Method Label | Observer | Operator | Maintenance | Planning Engineer |
|---|---|---|---|---|

| # | Function Name | Observer | Operator | Maintenance | Planning Engineer |
|---|---|---|---|---|---|
| 1032 | Graphics | Enable | Enable | Enable | Enable |
| 1033 | Links | Enable | Enable | Enable | Enable |
| 1031 | Block Comment | Enable | Enable | Enable | Enable |
| 1030 | Instance Comment | Enable | Enable | Enable | Enable |
| 1042 | Dynamic Config Tabs | Enable | Enable | Enable | Enable |
| 1043 | Dynamic Config Params | Enable | Enable | Enable | Enable |

| # | Screen Name | Observer | Operator | Maintenance | Planning Engineer |
|---|---|---|---|---|---|
| 1 | Start FileSet | Allow | Allow | Allow | Allow |
| 2 | Start Tracking | Allow | Allow | Allow | Allow |
| 3 | Identification | Allow | Allow | Allow | Allow |
| 4 | Configuration | Allow | Allow | Allow | Allow |
| 5 | Diagnostics | Allow | Allow | Allow | Allow |
| 6 | Compare | Allow | Allow | Allow | Allow |

Execute    ☑ Beep Me    ☐ Log to file

GENERIC UTILITY SUPPORTING ON-DEMAND CREATION OF CUSTOMIZABLE GRAPHICAL USER INTERFACES FOR VIEWING AND SPECIFYING FIELD DEVICE PARAMETERS

FIELD OF THE INVENTION

This invention relates generally to networked computerized industrial process control systems and, more particularly, relates to utilities providing lifetime support of field devices such as transmitters, positioners, etc. Tasks associated with such lifetime support include configuring, commissioning, monitoring, maintaining and replacing the field devices within an industrial process control system environment including potentially many types of field device types.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as adjust a valve position, or even move equipment into and out of service as required.

Typical industrial processes today are extremely complex and comprise many intelligent devices such as transmitters, positioners, motor drives, limit switches and other communication enabled devices. By way of example, it is not unheard of to have thousands of sensors and control elements (e.g., valve actuators) monitoring/controlling aspects of a multi-stage process within an industrial plant. As field devices have become more advanced over time, the process of setting up field devices for use in particular installations has also increased in complexity.

In previous generations of industrial process control equipment, and more particularly field devices, transmitters and positioners were comparatively simple components. Before the introduction of digital (intelligent) transmitters, setup activities associated with a field device were relatively simple. Industry standards like 3-15 psi for pneumatic instruments or 4-20 ma for electronic instruments allowed a degree of interoperability that minimized setup and configuration of analog transmitters.

More contemporary field devices that include digital data transmitting capabilities and on-device digital processors, referred to generally as "intelligent" field devices, require significantly more configuration effort when setting up a new field device. During configuration a set of parameters are set, within the new device, at either a device level (HART, PROFIBUS, FoxCOM, DeviceNet) or a block level within the device (FOUNDATION™ fieldbus).

Lifetime management of complex, intelligent devices requires any user performing any one of a variety of lifetime activities to possess considerable knowledge of the specific device that is being managed. In view of this need, a field device tool (FDT) standard was created that defines a set of interfaces for providing device-specific field device management user interfaces for a variety of devices via a set of device-specific add-on components.

A known FDT architecture comprises a frame application, device DTMs, and DTMs for communications devices (Comm DTMs). The FDT frame application implements FDT-compliant interfaces for DTMs to enable management of a variety of field device types, operating under a variety of protocols. The frame application (Platform) and DTMs, when combined, provide a set of graphical user interfaces (GUIs) that abstract specific implementation details of particular systems and devices thereby rendering differences between their associated protocols transparent to higher level applications built on top of the FDT architecture. Examples of such abstracted implementation details include: physical interfaces connecting to devices, persistent data storage, system management, and locations and types for device parameters.

In addition to the frame application, the FDT architecture, by way of example, also includes a communication device type manager (Comm DTM), a frame application, and device DTM. A Comm DTM performs the parameterization of communication devices such as Profibus-interface boards, Hart Modems or Gateways from Ethernet to Profibus. The Comm DTMs define a standard communications interface (e.g., Set, Get, etc.) for accessing data within online devices (e.g., Fieldbus devices) using a particular communications protocol.

Device DTMs, in general, are the drivers for lifetime management of field devices. Known device-specific DTMs encapsulate the device-specific data and functions such as the device structure, its communication capabilities, and internal dependencies. Device DTMs can also specify a graphic interface for presenting, for example, a configuration interface for an associated field device. The device DTMs provide a standardized set of interfaces to device data within field devices. Device DTMs provide/support, for example, visualization of a device status, analysis, calibration, diagnostics, and data access with regard to devices with which the device DTMs are associated. Device DTMs plug into the Frame Application and become the high-level interface for the devices. Device DTMs communicate with their associated devices through standardized interface methods supported by Comm DTMs.

The following is a general example of a setup embodying the FDT architecture. A field device is mounted to a fieldbus. However, the device is not ranged out in the field. Instead, the operator, via a workstation, installs device DTM software on a computer executing the frame application that serves as the host of the DTM. Next, the Comm DTM for communicating with the field device is installed on the computer system having the DTM and frame application. The channel associated with the Comm DTM supports communications to/from the fieldbus. A pointer to the main interface the channel is passed to the device DTM. At this point the device DTM is able to speak to the field device through the channel according to the protocol specified by the channel using specified FDT interfaces.

In the above-described example, the device DTM is predefined for a particular device type. As such, the DTM cannot be used for other types of devices. Furthermore, providing specific DTMs for particular device types leads to a variety of vendor and device type-specific user interfaces. A known DTM development environment developed by CodeWrights GmbH implements a tool which allows a developer to create device-specific DTMs using HART Communication Foundation Device Description (DD) files as a starting point. However, the known DTM development tool requires expert programming knowledge to fully resolve and create the user interface. In the known DTM development environment DTMs cannot be created without a user first providing programming input.

SUMMARY OF THE INVENTION

In view of the challenges and complexities of maintaining field devices of potentially many types, including transmitters, positioners, motor drives, motor control centers, light curtains, limit switches and other communication enabled devices from a variety of vendors, giving rise to potentially many different types of associated user interfaces associated with a variety of device lifetime tasks, a universal device type manager (DTM) utility is described herein including a generalized architecture facilitating defining and generating user interfaces associated with a variety of field device types.

The utility includes a device description data store interface that provides access to a device description store wherein device descriptions for a variety of field device types are maintained. The device descriptions are provided by device vendors and are fully defined by the respective field bus organization. No specialized customization is done to the device descriptions by the device or tool vendors. The device description files are the same standard-compliant DD files that are registered by vendors with a respective fieldbus organization when the device is submitted for approval. A device type template store interface provides access to a set of device type manager definitions. A device type manager engine renders, on-demand, a customizable device type manager user interface providing user access to parameters and other information (e.g., manufacturer instructions, maintenance documents, etc.) for a field device type/instance based upon: (1) a device description obtained via the device description data store interface and (2) a device type manager definition obtained via the device type template store interface.

In a particular example, the utility is provided in the form of a component that implements Field Device Tool (FDT) compliant interfaces for Fieldbus Foundation (FF) devices. Thus, the utility can be dynamically incorporated into a FF-FDT compliant frame (host) application to provide user access to parameter sets and device information for a variety of FF device types. The utility is incorporated into the FF-FDT host application at start-up of the host application. The content of interfaces rendered on-demand are based upon a device description and device type template associated with a selection made by a user from a set of device types/instances enumerated by the frame application that hosts the universal FF device type manager utility.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 11 is an illustrative graphical user interface associated with a configuration screen accessed via a tab presented on the universal block type manager interfaces;

FIG. 12 is an illustrative graphical user interface associated with a tuning screen accessed via a tab presented on the universal block type manager interfaces;

FIG. 14 is an illustrative graphical user interface associated with a diagnostics screen accessed via a tab presented on the universal block type manager interfaces;

FIG. 16 is an illustrative graphical user interface associated with a security screen accessed via a tab presented on the universal block type manager interfaces.

DETAILED DESCRIPTION OF THE DRAWINGS

In accordance with the general FTD architecture described above, device DTMs are hosted by the frame application which provides a basic user interface framework within which the individual device DTMs provide their own specialized interfaces. The frame application includes a hierarchical directory tree arrangement that shows various selectable/configurable system resources. The frame application accesses the DTMs through interfaces to manage the DTMs. The DTMs access the frame through another set of interfaces that allow the DTM to acquire information from, and transmit data to, the frame application.

In summary of exemplary embodiments of the present invention described herein, lifetime management of a variety of field devices having differing device descriptions is supported by a single universal device type manager (DTM) utility. The universal DTM functionality renders on-demand, in association with an FDT frame application, a variety of device type-specific DTM user interfaces. In the illustrative embodiment, the universal DTM supplements device type-specific DTMs provided for specific field devices and enables customizable lifetime management user interfaces for field devices for which suitable DTMs are not available.

Figure 1:
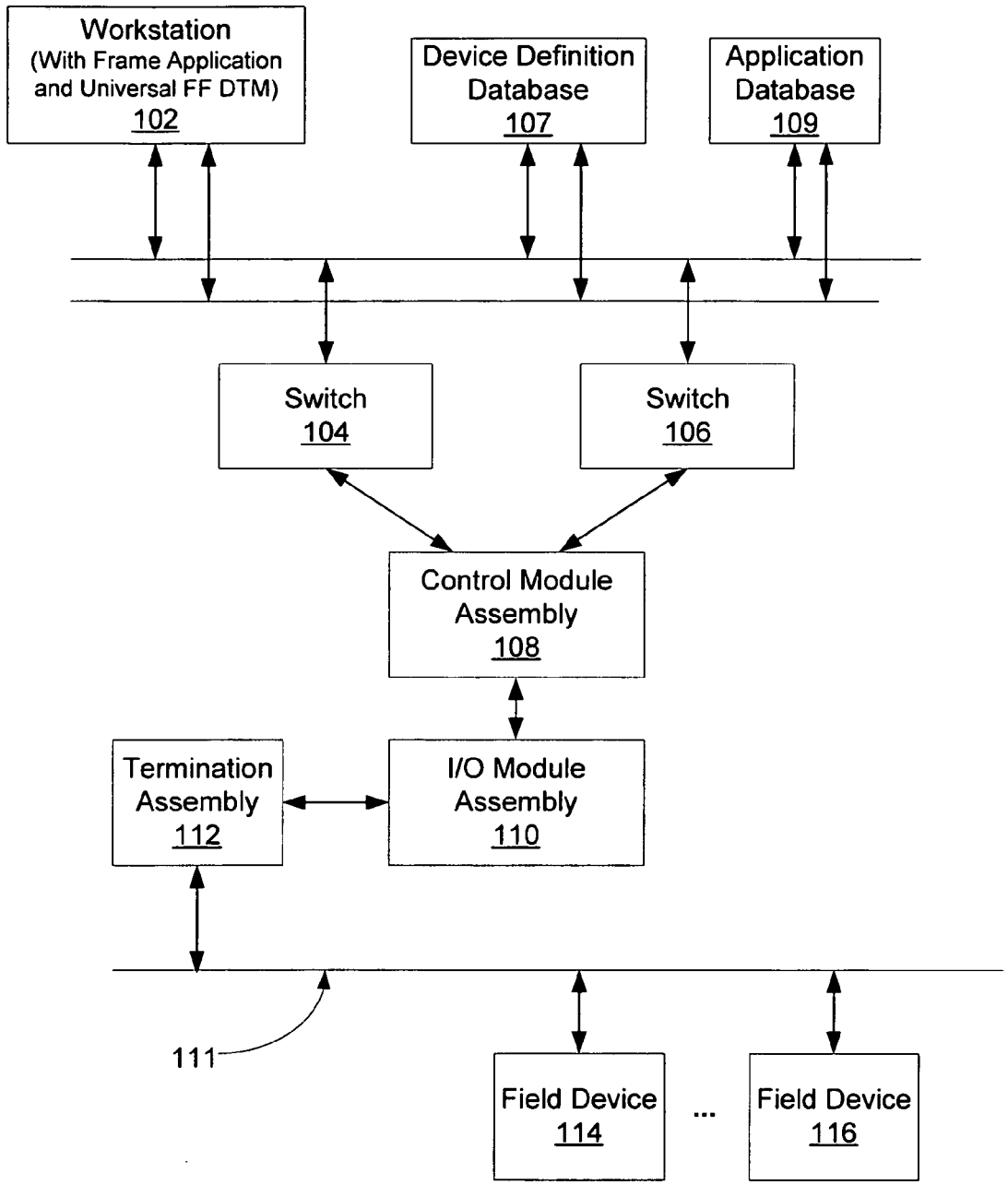
FIG. 1 is schematic diagram depicting an exemplary process control network environment wherein the present invention is potentially incorporated.

Turning to FIG. 1, an exemplary simple industrial process control system arrangement/environment is depicted. A workstation 102, comprising a variety of field device configuration and monitoring applications, provides an operator/engineering interface through which an engineer/technician monitors the components of an industrial process control system. The workstation 102 comprises any of a variety of hardware/operating system platforms. By way of example, the workstation 102 comprises a personal computer running on MICROSOFT's WINDOWS operating system. However, alternative embodiments of the invention can potentially run on any one or more of a variety of operating systems such as: Unix, Linux, Solaris, Mac OS-X, etc.

In accordance with an embodiment of the present invention, the workstation 102 hosts a frame application, a universal DTM, one or more Comm DTMs, and a set of device type-specific DTMs. The frame application, for example INVENSYS's IACC frame application, provides access to a database for persistent storage of device descriptions (device definition database 107) as well as an application database 109 that stores a set of DTM customization definitions for defining particular field device access via the universal FF DTM embodying the present invention.

As explained above, DTMs operate within an FDT frame application on the workstation 102. The frame application provides the specified FDT interfaces defined in the FDT specification. The FDT frame application comprises client applications that use DTMs, databases 107 and 109 for persistent storage of device descriptions/DTM parameters, and a communication link to the field devices. FDT frame applications are incorporated into engineering tools for control systems (e.g., INVENSYS's IACC) as well as standalone tools for device configuration. One or more Comm DTMs facilitate communications between the universal DTM and field devices.

In the illustrative example, the workstation 102, device definition database 107 and application database 109 are connected in a redundant configuration via dual Ethernet interfaces/wiring to redundant switches 104 and 106. The Ethernet switches 104 and 106 are commercially available and provided, for example, by Allied Telesyn (e.g., model AT-8088/MT). While not specifically depicted in FIG. 1, additional nodes, comprising workstations, servers and other elements (e.g., control module assemblies) of a supervisory portion of the process control system are potentially connected to the redundant switches 104 and 106. In the illustrated embodiment, a device definition database 107 and application database 109 store information regarding device types (templates) and device instances, respectively. Furthermore, while hardwired connections between the workstation and switches 104 and 106 via ETHERNET local area network links are depicted in FIG. 1, such links over a local supervisory level process control network are alternatively carried out via wireless network interfaces.

The switches 104 and 106 (as well as potentially other non-depicted switches) are also communicatively coupled to a control module assembly 108. The control module assembly 108 comprises one or more control modules (also referred to as control processors). An illustrative example of such control module assembly 108 is a Foxboro CP model FCP270, by Invensys Systems, Inc. In other embodiments, process control functionality is carries out in any of a variety of control modules—even by control programs incorporated into the workstations, intelligent transmitters, or virtually any communicatively coupled device capable of executing control programs, loops, scripts, etc.

With continued reference to FIG. 1, an I/O module assembly 110, alternatively referred to as a field bus module, is connected to the control module assembly 108. The communications protocols utilized for carrying out communications between the I/O module assembly 110 and control module assembly 108 is potentially any one of a variety of proprietary/non-proprietary communications protocols. In one embodiment, the communications between the control module assembly 108 and I/O module assembly 110 are carried out via a 2 MBit HDLC communication bus. While only a single I/O module assembly 110 is depicted in the illustrative example, embodiments of the invention comprise many I/O module assemblies.

The I/O module assemblies, in general, include a variety of interfaces for communicating directly and/or indirectly to a variety of devices including, for example, field devices. In the illustrative example, the I/O module assembly 110 comprises a Foundation Fieldbus I/O module (e.g., an INVENSYS's field bus module model FBM228) that supports communications between the control module assembly 108 and a Foundation Fieldbus network 111. In the illustrative embodiment, a set of representative intelligent field devices 114 and 116, containing multiple application-dependent configurable parameters, are connected to the Foundation Fieldbus network 111. The field devices 114 and 116 operate at the lowest level of an industrial process control system to measure (transmitters) and control (positioners) plant activity. A Termination Assembly 112 communicatively couples the I/O module assembly 110 to the field devices 114 and 116. The termination assembly 112 provides power and power conditioning to the extent needed by the field devices 114 and 116 on the network 111.

The process control network schematically depicted in FIG. 1 is greatly simplified for purposes of illustration. Those skilled in the art will readily appreciate that both the number of components, at each depicted level of the exemplary process control system, is generally many times greater than the number of depicted components. This is especially the case with regard to the number of depicted field devices. In an actual process control environment, the number of field devices, comprising both input devices (e.g., transmitters) and output devices (e.g., positioners) number in the hundreds for an industrial process control system. Incorporation of a field device configuration infrastructure/toolset that supports archiving configurable parameter value sets for each field device presently within a process control system, and thereafter downloading such parameter values into replacement field devices (of the same type and therefore having the same configurable parameter value sets as field devices that are to be replaced) at the time of replacement, facilitates streamlining the field device replacement task. Such infrastructure and replacement method are described further herein below.

Figure 2:
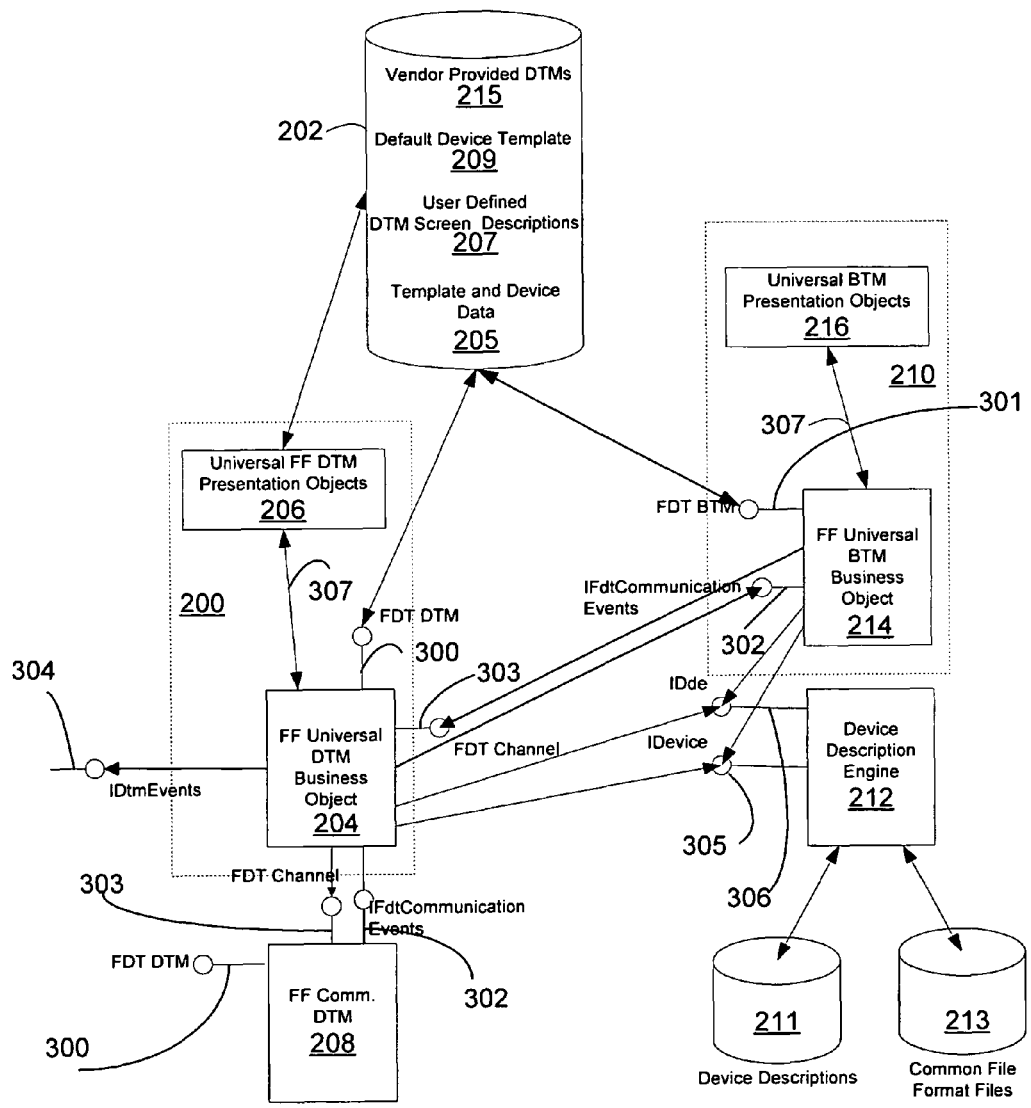
FIG. 2 schematically depicts a set of entities, and their corresponding interfaces, associated with an exemplary universal FDM embodying the present invention.

Turning to FIG. 2, a schematic diagram illustratively depicts primary components of an FDT application environment including a universal DTM 200 embodying the present invention. In the exemplary embodiment, the universal DTM 200 is implemented as a component object model (COM) object that complies with FDT specification 1.2, or higher, as further defined for FF. The universal DTM 200 comprises multiple sub-components that provide support for providing device type-specific DTM user interfaces according to a generic/default specification associated with the universal DTM 200. The primary program components of a universal DTM 200 are a business object 204 and one or more presentation objects 206.

An engineering database 202 includes device data 205, screen customization descriptions 207, and a default device template 209 (from which customized universal DTM templates are derived) comprise portions of an engineering database 202. A default device template 209 specifies the base functionality/appearance of the universal DTM 200, including tabs, buttons, etc.

The device data 205 contains the data values for device parameters configured through the universal DTM 200 or a universal BTM 210. The device data 205 is potentially either for a device template or for a device instance. The screen customization descriptions 207 specify customized screens defined by users including, for example, new tabs, security and access information displays.

The presentation objects 206 support user interface interactions for the universal DTM 200 (described further herein below with reference to a set of exemplary graphical user interfaces) in accordance with user-specified customizations, provided by the screen customization descriptions 207, to a default graphical user interface specification provided by the default device template 209 using the device description 211 and common file format 213. The business object 204 is a server component and, in addition to supporting interactions with the presentation objects 206, supports interactions between the universal DTM 200 and external components. Customized behavior of the business object 204 for a selected device/type template is defined by a set of device/type-specific parameter values retrieved from the device data 205.

In accordance with an embodiment of the present invention, both the universal DTM 200 and the universal BTM 210 are defined and created for a particular specified device type template/instance, on-demand, by default definitions from the default device template 209 and a specified DD provided from device descriptions 211 via a DD Engine 212. The DD engine 212 also provides access to device information maintained in CFF data 213. The BTM 210, including BTM business object 214 and presentation objects 216, operates upon blocks associated with device templates and instances represented in the universal DTM 200 in a manner analogous to the operation of the universal DTM 200.

The engineering database 202 is also a source of vendor-provided DTMs 215. In contrast to the universal DTM 200, which is capable of supporting any device for which a standard Fieldbus Foundation device description (DD) is provided, the vendor-provided DTMs comprise statically defined DTMs that are intended to provide engineer access to the configuration/run-time parameters of a particular device type.

Examples of external components to which the business object 204 communicates include: a Comm DTM 208, block type managers (BTMs)—including a universal BTM 210, and the device description (DD) engine 212. The DD engine 212 provides requested device descriptions and common file format files. BTMs provide access to block information associated with a designated FF device/type. The function blocks of a field device are described by BTMs that are child objects of the universal DTM 200. The Comm DTM 208 facilitates communications between the universal DTM 200 and field devices. The business object 204 also supports communications between the universal DTM 200 and the BTMs. Interfacing to the frame application, within which the universal DTM 200 operates, is through the FDT DTM interfaces (described herein below).

With continued reference to FIG. 2, the business object 204 carries out a variety of functions in support of the overall universal DTM 200's functionality. The server functions supported by the business object 204 are potentially used by frame applications without user interaction. The business object 204, in an exemplary embodiment, implements as many functions as possible, thereby allowing a slim implementation of the presentation objects 206. The following exemplary list of functions is implemented by the business object 204.

Administering device parameters and attributes
Interacting with interfaces to communicate with a device (upload/download parameters) via Comm DTM 208
Maintaining channel objects that communicate with BTMs 210
Interacting with the DD Engine 212
Supporting device parameter access services
Comparing old/new/requests device parameter values
Implementing the core FF FDT Interfaces
Generating device documentation
Storing device parameters The business object 204 provides the FDT interfaces required to store/restore parameters to/from the device data 205. In further support of the editing functionality provided by the universal DTM 200, an old value (before the editing) is maintained for each parameter. Furthermore each parameter will have status information for each data source by specifying a parameter status of the parameter within the project (storage) database and the device data 205.

Turning to the functionality of the presentation objects 206, when invoked the presentation objects 206 load a set of device parameters from the business object 204. Exemplary device parameter value types provided by the business object 204 to the presentation objects include: names, labels, descriptions, units, data types, security/access information—each parameter has an attribute to control read and write access of each parameter in an displayed security/access grid for a device template/instance. The presentation objects 206 maintain a separate (temporary) "edit" database with regard to device parameter values that facilitate a variety of user interaction modes described herein below.

User Interaction Modes
    Edit Mode: This mode distinguishes the granularity in which parameter changes will be written into the database (storage or device database):
      Block Mode:
        The user is able to change several parameters in the different tabs of the presentation object. Selecting the Save button writes the changes to the business object 204 database 205 and in a frame application database. If the DTM is connected to the device it is also possible to work in this mode. Changes are only downloaded to the device when an "Apply" button is pressed. If the user presses cancel button the changes are lost. If the device is connected and the user presses the 'Direct Mode' button the UDTM GUI switches to the 'Direct Mode' user interaction style.
      Direct Mode:
        The Direct Mode is used for immediate change of single parameter values. After the user changes a parameter and leaves the input control for this parameter, the parameter is validated and written into the database. The direct mode is only available when the device is connected. If the device is connected and user presses the 'Block Mode' button the UDTM GUI switches to the 'Block Mode' user interaction style.
    Connection mode: In this mode the following states are distinguished:
      Not connected (sometimes called Off-line): The universal DTM is not connected with a device. There is no communication/data exchange with the device.

Connected (sometimes called On-line): The universal DTM is connected with a device. There is communication/data exchange between the universal DTM and the device.

Device templates are always offline

The default template for the presentation objects 206 of the universal DTM 200 includes a set of buttons supporting user interaction. The default set of buttons provided for presentation objects 206 include the following:

Save: is available on the screens where DTM data can be changed. The save button will trigger a request to the frame application to save the current DTM data to the database.

Download: Write to the device parameters which have been modified by the user

Download All: Write to the device all parameters which the customization has marked as downloadable parameters. The write occurs regardless of whether the parameters have been modified Upload All: Read from the device all parameters which the customization has marked as uploadable parameters. Parameters are not written to the database until a Save is done.

With continued reference to FIG. 2, set of program interfaces are provided that facilitate invoking various functions supported by the displayed components. The following interfaces are implemented by the exemplary universal DTM 200 to carry out functionality described herein regarding the lifetime management of field devices via a generalized device management utility. In an exemplary embodiment depicted in FIG. 2, the following interfaces are supported:

FDT DTM interfaces 300 correspond to the mandatory interfaces for any DTM (universal or vendor supplied). The mandatory interfaces include a set of well known interfaces:

IDtm—The primary interface used to interact with DTMs. This interface provides the ability to get other interfaces implemented by the DTM. This interface provides the functions required to start up a DTM. This interface also provides functions to get the list of user interface actions supported by the ActiveX presentation objects which are part of the DTM.

IDTMActiveXInformation—The interface used to retrieve a pointer to the ActiveX presentation object of the DTM which implements a supported function of the DTM.

IDtmInformation—The interface used to query the DTM for information on what devices it is capable of configuring FDT BTM interfaces 301 comprise the mandatory interfaces for any BTM (universal or vendor supplied). The mandatory interfaces include a set of well known interfaces:

IBtm—The primary interface used to interact with BTMs. This interface provides the ability to get other interfaces implemented by the BTM. This interface provides the functions required to start up a BTM. This interface also provides functions to get the list of user interface actions supported by the ActiveX presentation objects which are part of the BTM.

IDTMActiveXInformation—The interface used to retrieve a pointer to the ActiveX presentation object of the BTM which implements a supported function of the DTM. This is the same interface as defined for DTMs IBtmInformation—The interface used to query the DTM for information on what devices it is capable of configuring The universal DTM 200 also includes a set of well known FDT Channel Interfaces 303 that represent mandatory interfaces for communication. These interfaces include:

IFdtCommunication—This is a standard FDT 1.2 interface which is the primary interface through which read and write requests are transmitted.

IFdtChannelSubtopology—This is a standard FDT 1.2 interface which is the interface that provides the functions through which the DTM implementing the channel interface is informed of the DTMs or BTMs that will be using the channel interface.

FDT interfaces are provided for notification of communication completion. In the illustrative embodiment the well known FDT IFdtCommunicationEvents interface 302 is implemented by DTMs or BTMs to receive notification when read or write requests complete.

FDT interfaces are provided for notification of events to to a host application (or another other interested external entity. In the illustrative embodiment, IDtmEvents 304 is an FDT 1.2 standard interface for sending event notifications from a DTM to the requesting entity.

Private DTM interfaces between business objects and presentation objects of a universal DTM or BTM, described further herein below, support exchanging information between the business object 204 and presentation objects 206 implementing ActiveX controls, or the business object for a universal BTM 214 and the presentation object 216.

The mandatory portions of the FDT (1.2) interface 300, 301, 302, 303, and 304 are well documented and therefore will not be specifically described herein. In addition to mandatory interfaces of the FDT 1.2 specification, the universal DTM 200 implements the following optional interfaces:

The universal DTM 200 implements the function IDtmDiagnosis::Compare

This function allows comparing two offline device databases. It is a business object function and could be used by applications for comparisons.

The universal DTM 200 implements the function IDtmOnlineDiagnosis::Compare

This function allows the comparison of an offline device database with the online device data. It is a business object function and could be used by applications for comparisons.

The universal DTM 200 implements a IDtmDiagnosis::InitCompare method

This method defines the meaning of "DTMs of the same type" for purposes of determining whether two DTMs are of the same type, and therefore eligible for compare object. Two DTMs are of the same type when:
the second DTM for the comparison specifies a same vendor name/ID
the second DTM has the same required Bus Protocol
the second DTM has the same Manufacture-ID,
the second DTM has the same Devicetype-ID
the second DTM has the same Subdevice-Type, if available If all the checks are successful, then the InitCompare method returns true and a compare of the DTM instance data sets is permissible.

The universal DTM 200 implements IDtmOnlineDiagnosis::GetDeviceStatus

This function retrieves the device status and returns a list with the latest status indications in user readable text form. It is a business function (without user interface) and could be used by applications to get the detailed device specific status information.

The universal DTM 200 implements the functions IDtmParamter::GetParameters and SetParameters This function allows the frame applications to retrieve and store the device parameter information (detailed parameter information).

Additionally the universal DTM 100 implements the following FDT 1.2.1 specified interfaces: IDtmSingleDeviceDataAccess and Interface IDtmSingleInstanceDataAccess.

The function block functionality in an FF device is described with BTMs. BTMs are child objects of the universal DTM 200 and are connected to communication channels supported by the universal DTM 200. The universal DTM 200 uses a DD Engine 212 interface (I_Device 305) to identify which and how many block types could be connected to the universal DTM 200. For each device type, the DD Engine 212 creates, based on the information coming from the CFF file for each block, a unique UUID. The universal DTM 200 uses the DD Engine interfaces to retrieve the UUIDs for the possible block types and creates for each a channel object. Each channel object uses one unique block type UUID as a 'supported protocol' ID to identify which block type could be connected. For each possible block connection a channel object is created by the universal DTM 200. The UUID information is used as a block protocol identifier between the universal DTM 200 and a universal block type manager of the set of BTMs 210.

Standard FDT topology mechanisms and interfaces are used to assign a BTM to a DTM. If the DTM has child BTMs, it acts as a gateway. Mechanisms of nested communication defined in the FDT Specification are used for communication between the BTM and the DTM. If a DTM must create a BTM, it uses the standard interface IFdtTopology of the frame application. The frame application instantiates the BTM. Verification of assigned Child-BTMs performed by invoking the ValidateAddChild( ) method in the DTM of the IFdtChannelSubTopology interface. The frame application handles the instantiation of the BTMs.

The universal DTM 200 implements a private interface, I_DtmBusinessObject 307 that allows for the exchange of information between the business object 204 and the presentation objects 206 (e.g., ActiveX control presentation objects). A universal BTM of the BTMs 210 uses the same interface to access the private business object 204 information. For this the universal BTM implements an object with a callback interface to get notifications from the business object 204. Using the interface I_DtmBusinessObject 307 the Universal BTM is able to access some additional (private) information from the universal DTM 200.

This information can be
  Device Type related
  Device Instance information—the device tag, device ID, etc.
  Block Type and instance related
Device Type related information includes:
  Device Type
  Device identification information (Device Manufacturer, device type, version, DD and CFF versions)
Device Instance information includes:
  Device Tag
  Device ID
  Device Address
  Overall device status
  Resource block mode The above-identified information is stored in the universal DTM 200 as parameters. The universal BTM uses the universal DTM 200 interface function getParameterValue to access any parameter in the universal DTM 200.

A set of enumeration operations are defined that enable retrieval of parameter statuses and values from the universal DTM 200 and for notification callback functions to give notification of any value and/or status changes:

paramStatus: Enumeration type that is a superset of all possible status values for database sources. Depending on the selected database source not all values are applicable:
  initial: value is initialized after INIT by device default values
  storageLoaded: value is loaded from storage (project DB)
  storageSaved: value is saved into storage (project DB)
  uploaded: value is uploaded from device (device DB)
  downloaded: value is downloaded into device (device DB)
  uploadFailed: value failed to be uploaded from device (device DB)
  downloadFailed: value failed to be downloaded into device (device DB)
  dynamicUpdated: value is successfully uploaded from the device in cyclic manner
  dynamicUpdating: upload of the cyclic value is in work
  insecure: cyclic upload of the value timed out. The device database value contains the last valid value and is insecure.
  editError: temporary value has caused an error condition after editing
  matching: temporary value matches the value in data source after editing
  modified: temporary value is not equal to the value in data source after editing
  userConfirmationNeeded: value needs confirmation by the user. It changed because a related parameter caused a change of this parameter (change of units or ranges)

A list of functions and methods are enumerated below that are supported by the private universal DTM interface I_DtmBusinessObject 307 supported by the business object 204.

Attach: is a function that facilitates obtaining configuration information from the business object 204. The caller provides a callback interface as parameter, and the function returns an identifier ocxid to be used as argument ocxid of all other interface methods. This function also returns additional information and interface pointers to an xml manager and the FDT container within which the business object 204 operates.

Detach: disconnects the requestor from the business object 204.

isOnline: checks whether the business object 204 is online.

getLanguageId: Returns languageId of the business object 204. The language ID must be used to load language specific resources InvokeFunction: allows invoking a specified function supported by the business object 204.

runningFid: the presentation objects 206 notify the business object when an invoked function with a specified function ID is running. The handled function id is set after extracting the functional document getParameterDescription: obtains parameter information e.g. description, paramter group, tokenized string if available and a device parameter description including a number of fields defining properties of the identified parameter.

getParameterValue: provides a requested parameter value as a variant, thereby allowing reading of any identified business object parameter value.

setParameterValue: sets an identified parameter value. If the request fails, an error message is returned.

getParameterAsString: provides a requested parameter value as a string.

setParameterAsString: sets an identified parameter value using a string value. If the parameter value is not valid, then an error message is returned.

isActualParameterValue: determines whether actual parameter value in the device and the temporary value of the parameter are equal getActualParameterValue: provides the actual (device) parameter value as a variant.

getActualParameterAsString: provides actual (device) value as a string getDefaultParameterValue: provides the default parameter values as a variant.

getDefaultParameterAsString: provides the default parameter value as a string.

GetParameterLabel: provides the parameter label (for displays) of an identified parameter.

GetParameterUnit: provides the unit of a parameter. If the paramter does not have a unit the returned string is empty.

GetParameterMaxLength: provides the maximum length of an identified parameter. This is needed for parameters which do not have fixed length.

GetParameterEnumQualifiers: converts, using the EnumQualifierString, an enum ordinal value to an enum string VerifyParameters: verifies the identified parameters (if verification is available).

GetNParameters: provides the current number of parameters in the business object 206.

GetParameterName: provides a name of a particular (indexed) parameter within a parameter list.

GetParameterNames: provides a list of names of all parameters that contain a specified search string in their name.

SetParameterModified: sets the modified flag of a parameter.

UploadParameterListStart: starts uploading specified device parameters to a presentation object.

UploadParameterAllStart: starts uploading all device parameters to a presentation object.

DownloadParameterListStart: starts downloading specific device parameters. If a directdownload flag argument is true, then no device state handling (Pre and Post download actions) is performed. If a modified flag is set to true, only the modified parameters will be downloaded.

DownloadParameterAllStart: starts downloading all device parameters for an identified presentation object. If the directdownload flag is true, then no device state handling (Pre and Post download actions) is performed. If the modified flag is set to true, then only the modified parameters will be downloaded.

DownloadParameterGroupStart: starts downloading all device parameters of a group. If directdownload is true, then no device state handling (Pre and Post download actions) is performed. If the modified flag is set to true, then only the modified parameters will be downloaded.

RegisterCyclicParameter: Parameters could be registered in the business object 204 to be uploaded in a cyclic manner. The upload is done by the business object in the specified cycle on its own. With this function it is possible to register parameters for cyclic uploads from the device. If cycle is 0, parameters are removed from cyclic processing. With cycle=1 the parameter is automatically uploaded from the device by the business object 204 with the fastest update cycle. With cycle=2 the update will be done in every second cycle. Via a callback interface method OnRegisteredParametersChanged, an associated presentation object receives a notification when the upload of the cyclic parameters is completed.

PauseMeasurement: pauses cyclic uploading of parameters. This is needed for activities like calibration steps, which should not be disturbed by a cyclic upload of parameters.

ResumeMeasurement: resumes measurement after successful completion of a PauseMeasurement function.

GetLastDeviceStatus: provides the last retrieved fieldbus specific device status value.

AuditTrail_StartTransaction: marks the start of an audit trail transaction.

AuditTrail_EndTransaction: marks the end of an audit trail transaction.

AuditTrail_Enabled: determines whether an audit trail for a device DTM is supported and returns the availability of audit trail functionality.

AuditTrail_FunctionEvent: enters an audit trail function event entry into the audit trail system.

AuditTrail_DeviceStatusEvent: enters an audit trail device status event entry into the audit trail system.

LockDataSet: locks the business object 204's data set (allows write access to parameters). This locking is used to coordinate parameter changes between different presentation objects.

UnLockDataSet: unlocks the business object 204's data set.

GetNTrendParameters: returns the number of device parameters which are marked for trending GetTrendParameter: returns information for the device parameter for trending for an id number. The id number is between 0 and (getNTrendParameters( )−1). The information is needed to set up the scales and axis description of the trend curves.

GetHelpfile: returns the name of a help file for a device DTM.

TraceMessage: sets a trace message within the business object 204.

GetProtocolParamlength: retrieves the protocol specific parameter length for parameters.

GetDataLength: retrieves the protocol specific data length (size) for a certain data type.

DeviceCommandStart: sends a protocol specific command directly to the device.

getNavigationDocument: returns an xml document to configure navigation.

GetUserInformation: provides an FDT user information data structure.

PrivateDialogEnabled: returns information from a private dialog.

OpenActiveXControlRequest: calls a function in the business object 204 from one of the presentation objects 206 to start another presentation object instance.

getCompareDTM: provides a pointer to a DTM selected within the previously described IDtm/Diagnosis::InitCompare method.

GetParameterSecAttrOPAccess: provides security attributes for functions and screens. For each universal DTM function and screen there is a security parameter that holds the access information (notvisible, disabled, enabled) for each user level (observer, operator, maintenance, planningEngineer) and the Administrator or OEM-Service qualifier.

SetParameterSecAttrOPAccess: sets the security attributes for functions and screens. For each universal DTM function and screen there is a parameter, which holds the access information (notvisible, disabled, enabled) for each user level (observer, operator, maintenance, planningEngineer) and the Administrator or OEM-Service qualifier.

GetParameterSecAttrRWAccess: provides security attributes for a parameter. Each parameter holds the access information (nv=not visible, ro=read only, rw=read/write) for each user level (observer, operator, maintenance, planningEngineer) and the Administrator or OEM-Service qualifier.

SetParameterSecAttrRWAccess: sets the security attributes for a parameter. Each parameter holds the access information (nv=not visible, ro=read only, rw=read/write) for each user level (observer, operator, maintenance, planningEngineer) and the Administrator or OEM-Service qualifier.

getParamStatus: provides the status information for a specified parameter paramName and database source.

getParamAllStatus: provides all status information for a specified parameter.

getParamStatusAndValue: provides a temporary value and the status information for a specified parameter paramName and database source.

getParamAllStatusAndValue: provides a temporary value and all status information for a specified parameter paramName.

With continued reference to FIG. 2, a callback interface IdtmEvents 304 is implemented by any entity that seeks to receive notifications from the business object 204.

OnUploadFinished: the client of the callback interface receives a notification when an upload of parameters has finished. A success flag indicates whether the upload operation was successful.

OnDownloadFinished: the client of the callback interface receives a notification when a download of parameters has finished. A success flag indicates whether the download was successful.

OnOnlineStateChanged: enables the client of the callback interface to receive a notification when the online state of the business object 204 changes.

OnParamChanged: enables the client to receive notification of any changes of the temporary value and/or the status information for a specified parameter (paranName) and database source. A source argument identifies which data source value and/or status changed. Upload and download actions may trigger OnParamChanged notifications with the database source flag set to databaseSource::device. Project save or project load actions may trigger OnParamChanged notifications with the database source flag set to databaseSource::storage. Edit actions may trigger OnParamChanged notifications with the database source flag set to databaseSource::All, because the temporary value changed compared to all (both) data sources.

The interfaces supported by the universal DTM 200 to the DD engine 212 (I_Dde 306 and I_Device 305 interfaces) enable the universal DTM 200 to obtain device type specific information from the DD and CFF files managed by the DD engine 212. I_Dde 306 is the main interface for the DD engine 212. The I_Dde interface 306 provides exposes methods for initializing the DD engine 212 and exposing the common information for the overall program behavior. The I_Device interface 305 provides an interface for device handling such as getting device information, block information, global device parameter information, system management information, network capabilities, etc.

Figure 3:
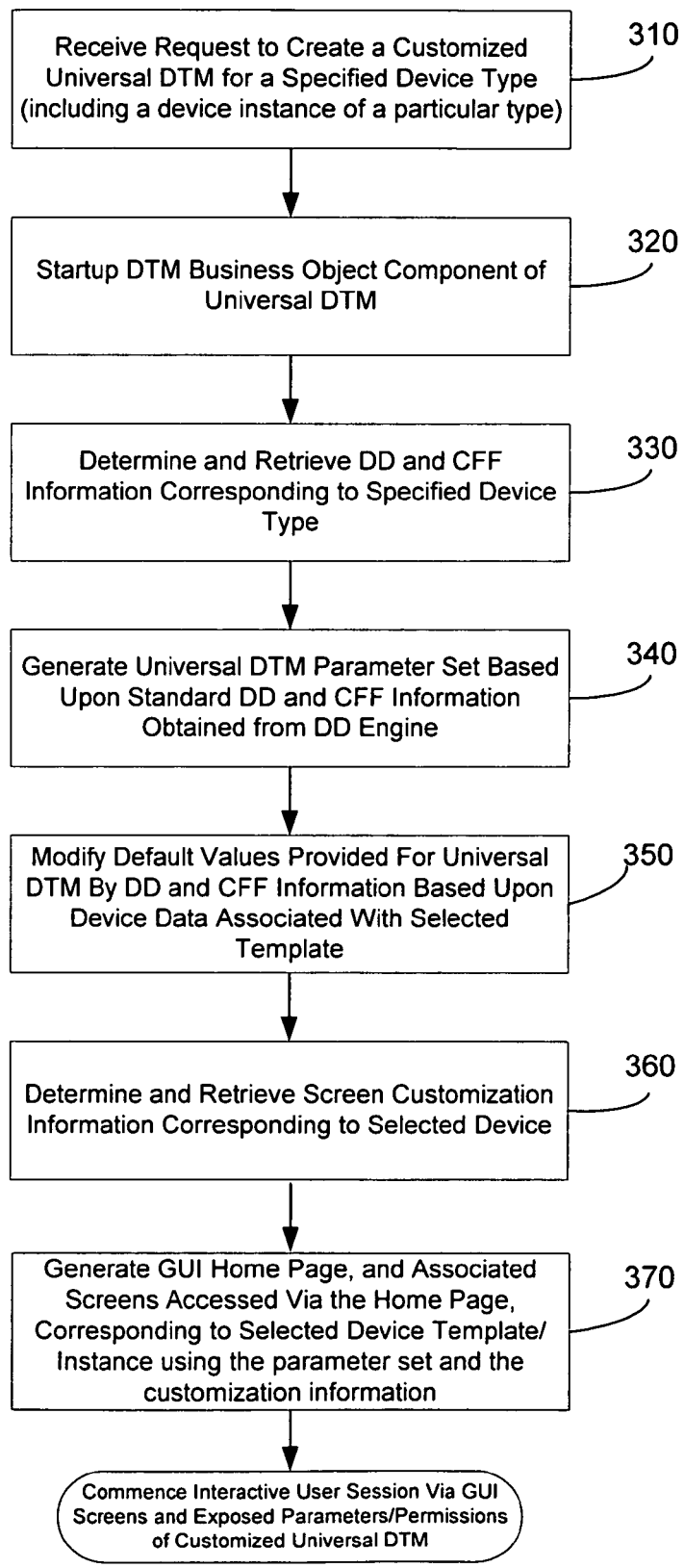
FIG. 3 is a flowchart summarizing the on-demand creation of a customized universal DTM for presenting a set of GUIs associated with lifetime management of any device for which a standard device description (DD) is provided.

Having described an exemplary architecture for the universal DTM 200 embodying the present invention, attention is directed to FIG. 3 wherein a flowchart summarizes a set of steps for dynamically building the universal DTM 200 within a frame application implementing FTD interfaces. The series of steps provided in FIG. 3 further illustrate the dynamic/on-demand nature of building a customized universal DTM. Initially, during step 310, a host application such as INVENSYS' IACC receives an initial command via a graphical user interface to create a customized universal DTM based upon a specified device template or instance (see, FIG. 4 described herein below). In the illustrative example, the device types are all Fieldbus Foundation device types, and the breadth of device types handled by the single universal DTM is confined to devices within the FF class. However, in alternative embodiments, the universal DTM is expanded to handle an extensible set of classes.

In response to the received request, at step 320 the host application starts up the business object 204. Thereafter, at step 330, the host application defines the Device Description and the Common File Format entries to be retrieved via the DD Engine 212 corresponding to a device type associated with the previously user-specified device type, and the appropriate DD and CFF files are thereafter obtained. The DD and CFF define, at least in part, the customized aspect of a default DTM associated with the universal DTM 200.

After obtaining the appropriate DD and CFF files via the DD engine 212, at step 340 the universal DTM business object 204 uses the device information in the retrieved device description and the common file format files to generate a parameter set for populating placeholders within the specified device template (applicable to all FF devices) based upon the DD and CFF information corresponding to the identified FF device type.

During step 350, to the extent that the user has selected a non-default pre-existing template upon which the customized universal DTM is to be based, data for the device template is retrieved from the device data 205 portion of the engineering database 202. In an illustrative example, the host application utilizes the FDT DTM Interfaces 300 in the DTM business object 204 to set the device template data within the customized universal DTM. If there is no device template data in the engineering database 213, the default values specified in the common file format and the device description are used for the parameter set values. If there is template data in the engineering database 202 corresponding to the selected template, then the values from the device data 205 entry is used to set corresponding values of the parameters for the customized universal DTM.

Next, at step 360, user interface definitions are retrieved for the device template from the user defined DTM screen customization descriptions 207 portion of the engineering database 202.

In step 370, the universal DTM Presentation object 206 generates a graphical user interface display corresponding to the selected template using the user defined DTM screen definitions and parameter data set in the universal DTM business object 204.

By way of example the host application retrieves a pointer to the presentation object 206 of the universal DTM 200. The pointer corresponds to a first screen presented (the "Home Page" described further herein below with reference to FIG. 5) from the business object 204. The presentation object 206 is used to display the first screen for the customized universal DTM. The presentation object 206 retrieves parameter values and information associated with the selected device template/instance from the business object 204. Furthermore, the presentation object retrieves user interface definitions associated with the selected device template/instance from the screen customization descriptions 207.

Once the customized universal DTM is created on-demand by a user's selection via a host application, the user can select one of a set of option tabs to access particular types of information associated with the device template/instance. These functions/capabilities are described herein below with reference to FIGS. 6-9. Thus, in accordance with an embodiment of the present invention, customization information is applied to a default universal DTM shell to render a customized universal DTM. The customization information is obtained from various sources, including DDs, CFFs, user-defined device data and screens to render, on-demand, a customized universal DMT for performing any of a variety of operations relating to lifetime management of FF device instances. Such operations include: creating new device type-specific templates from a default template, deriving and saving application-specific templates for previously created device type-specific templates, and managing on-line field device instances via device instances created from the previously defined templates.

Figure 4:
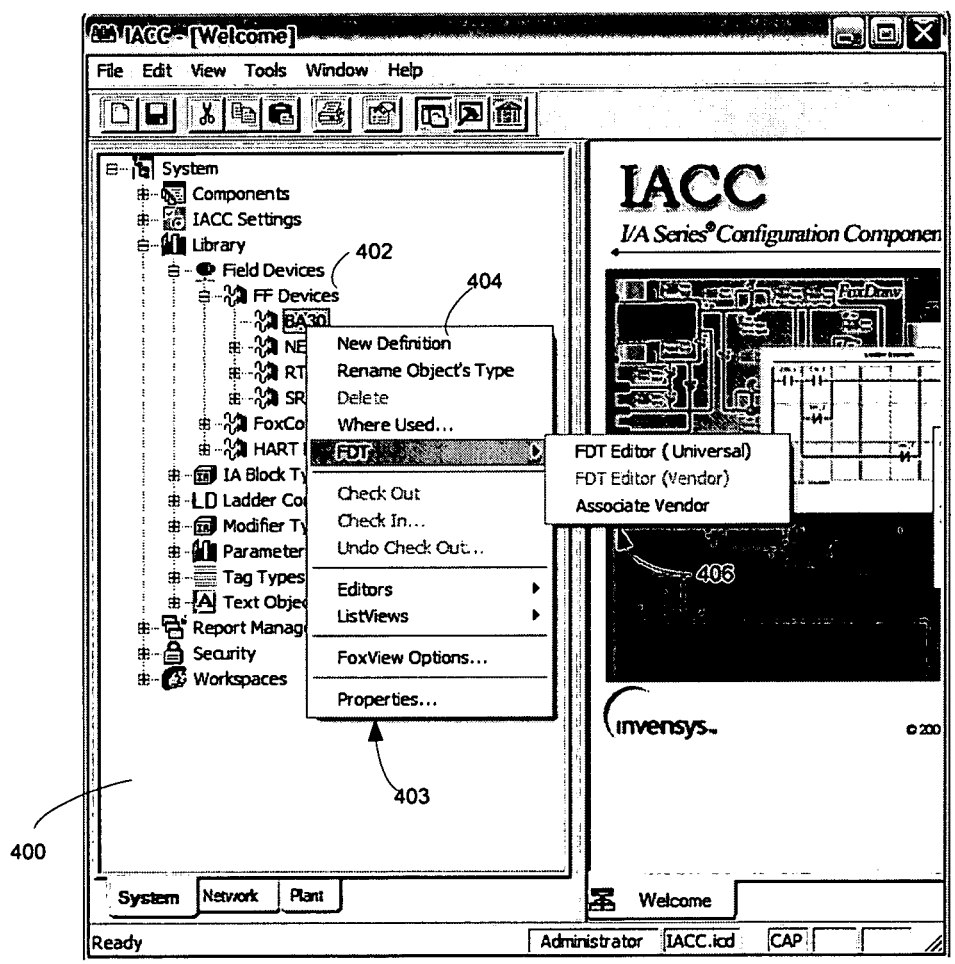
FIG. 4 is an illustrative graphical user interface associated with launching a DTM from a host application.

Having described an exemplary architecture for the universal DTM 200 embodying the present invention as well a method for building the universal DTM 200, attention is now directed to a set of graphical displays associated with various aspects of the universal DTM 200's operation. FIG. 4 depicts an exemplary graphical user interface provided by an exemplary frame application, embedded within INVENSYS I/A Series Configuration Component (IACC), from which a user launches the universal DTM 200 for a selected target device. The frame application also provides FDT compliant interfaces for the universal DTM 200 once it has been launched.

The universal DTM 200 operates upon device templates derived from a default template or any other parent template. The hierarchical inheritance/derivation relationship between various device templates, and instances created from the templates, follows the hierarchical arrangement of the tree structure depicted in the system pane 400. In particular, a FF Devices node 402 on the tree of system elements is associated with a default FF device template that defines a default set of behaviors for the universal DTM 200 when operating in a Fieldbus Foundation device context/mode. Each of the child nodes under the FF Devices node 402 (e.g., "BA30") is associated with a template derived from the default FF device template. Each child template is characterized by the default template specification and a set of modifications to the default template to render the child template. A user defines such child nodes by selecting the parent node (in this case the FF devices node), right clicking to expose a context menu 403, and then selecting the "New Definition" option 404. Thereafter, the user is prompted to provide a name for the new template (for display on the tree) as well as other information (including a DD file) associated with the child template. The derived template is saved as a child node of the template node from which it is derived. An inheritance relationship is thus established between a parent template and all children derived therefrom.

While only one level of derived FF device templates are depicted in FIG. 4, the system described herein is capable of handling several hierarchical derivation levels. For example, selecting the "+" symbol under any of the other three child nodes under the FF Devices (default template) node, a second level of derived templates are revealed. Such template inheritance can be applied to render a set of application-specific device DTMs. For example, a pressure transmitter DTM template can have a set of application-specific child templates for use in flow, tank level, and pressure applications.

Supporting hierarchical template definitions provides a number of advantages. One or more levels of derivation can be used to incorporate application-specific knowledge into more generally defined parent (e.g., device-specific templates)—information that would otherwise need to be provided by a commissioning engineer in the field. At each level, the information defined for a device becomes more specific. Including application-specific information in one or more levels of child device templates can thus save time when deploying or replacing devices as well as reduce the knowledge load on device commissioning agents. Such use of a hierarchy of templates with various degrees of application-specific knowledge applied at the various levels, in the context of the universal DTM 200, also facilitates standardizing device configuration across a project or enterprise by ensuring a certain degree of common behavior/operation of devices used in similar applications. Such standardization cannot otherwise be assured in without time-consuming/exhaustive review of potentially very large numbers of parameter values assigned to hundreds or even thousands of devices distributed across an enterprise.

Selecting FDT on the context menu 403 exposes an FDT sub-menu 406. In the illustrative example, the FDT aspect of the IACC system supports both vendor-specific DTMs and universal DTM implementations for selected device types. Selecting the Associate Vendor option on the FDT sub-menu 406 enables a user to launch any one of potentially multiple vendor-coded DTMs within the IACC frame application. Such specialized vendor-developed/coded DTMs are well known in the art and will not be discussed further herein. However, if a user instead selects the FDT Editor (Universal) menu option on the FDT sub-menu 406, then the universal DTM 200 embodying the present invention is launched, on-demand, based upon the currently selected template node (BA30) and a standard DD provided from a library of standard DDs managed by the DD engine 212. In contrast to known DTMs, the universal DTM 200 is customized on-demand to a specific device type, at the time it is launched by a user's input. The device-specific customizations to the universal DTM 200 are based upon a DTM template (corresponding to the currently selected node on the system tree within pane 400) and the associated standard DD associated with a device type associated with the DTM template. By deriving from a common default behavior, the resulting customized universal DTM interfaces share a common base functionality and look-and-feel for users.

Figure 5:
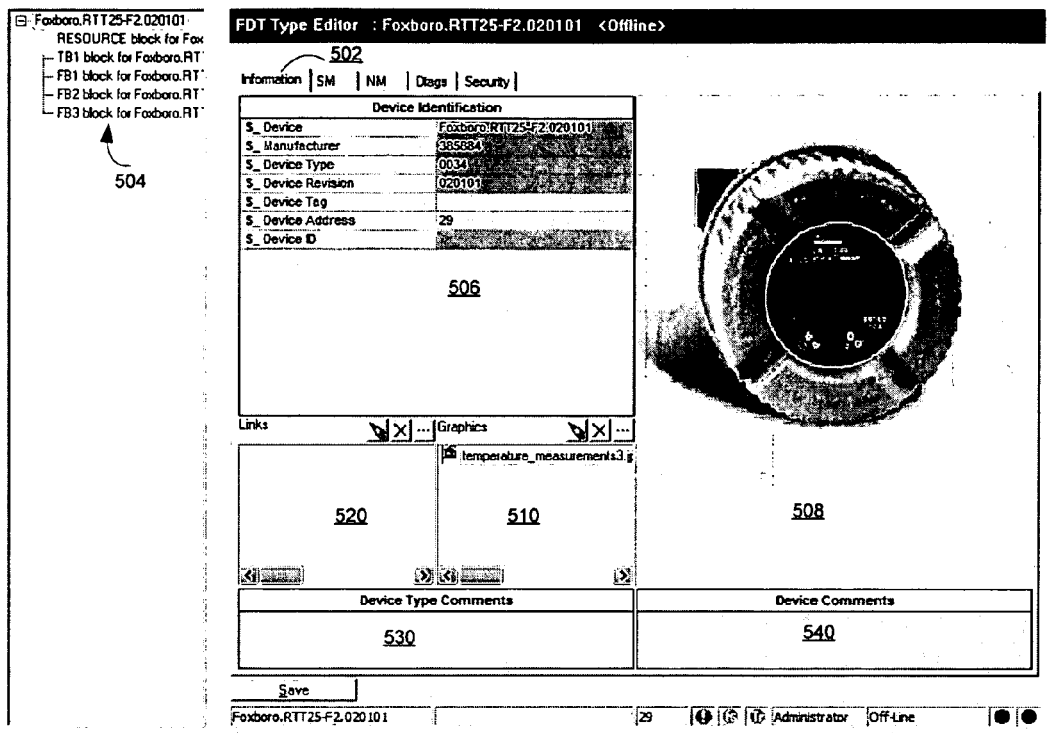
FIG. 5 is an illustrative graphical user interface associated with a device home page rendered by a universal device type manager.

When a customized universal DTM is initially launched within a frame application, a first screen or "home page" graphical user interface 500, of a type depicted in FIG. 5, is generated by the presentation object 206. The home page graphical user interface includes a variety of status notifications as well as an initial set of information associated with the DTM customization template/instance and DD incorporated dynamically, on-demand into the universal DMT 200 at the time of launch.

In accordance with a default user interface specification, the graphical user interface for the universal DTM 200 includes an information tab 502 that is automatically selected when the on-demand customized universal DTM is launched. In the device information screen device identification and more general information about the device type represented by the template (or device instance created from a device-specific template) are displayed. A device tree 504 represents blocks associated with the current device type as a set of sub-nodes under a device template root name (e.g., Foxboro.RTT25-F2.020101). Selecting one of the block nodes under the device root launches a customized universal BTM instance to be launched and presentation of a block first screen (see, FIG. 10 described herein below) similar to the first screen for the customized universal DTM.

With continued reference to FIG. 5, a device identification pane 506 displays device type information from a DD and CFF obtained by the universal DTM 200 from the DD Engine 212. Such information includes: device manufacturer, device type, device version, DD version, and CFF file revision. The device identification pane 506 also provides specific device instance information including: device tag, device Address, and device ID. When the universal DTM 200 is connecting to a corresponding device it checks the device identification information against the loaded parameter values from the device.

A display box 508 potentially displays any of a variety of graphics displays associated with the specified device type referenced by the universal DTM 200. To enter a reference to a graphic (to be added to a list within a graphics files pane 510) the user clicks on an Add button. In a resulting popup menu the user selects a File Open option. With a resulting standard File Open Dialog the user navigates through a system directory and selects a file. Afterwards a dialog opens to let the user define whether the graphics should be instance or device type specific. To delete an entry the user selects the appropriate text reference within the graphics files pane 510 and presses a delete button. To display the information the user selects the reference. The graphics are thereafter rendered in the display box 508.

A links box 520 enables a user to enter electronic data links to any of a variety of information sources including URL's, network/file names, etc. referencing documentation in any of a wide variety of formats (e.g., .pdf, .bmp, .rtf, etc.). A user enters a link within the links box 520 by clicking on an Add Button. In a resulting popup menu the user selects File Open. With a resulting standard File Open Dialog the user navigates through a system directory and selects a file. Afterwards a dialog opens to let the user define whether the linked file/document should be instance or device type specific. To delete an entry the user selects the appropriate text reference within the graphics files pane 520 and presses a delete button. To display the information the user selects the reference, and the resulting information is rendered in a viewing application that is launched in response to the selection (e.g., a .pdf viewer application).

A device type comments box 530 enables a user to enter textual information for the device type. It will be stored and be visible for all device types. Edit functions are supported for adding or changing text within box 530. The text within the device type comments box 530 is stored with any other customization data associated with the particular derived template when the derived template is stored.

A device comments box 540 enables a user to enter textual information for a particular device instance. The content displayed within the device comments box 540 is only visible for the particular device instance, if any, associated with the current customized DTM instance. The instance specific information is stored with all other parameter values with the FDT interfaces for persistence data in the frame application's database. This information persists with the device instance and is not tied to any template.

Other types of materials potentially accessible from the first screen 500 for the customized universal DTM include: other applications, status buttons (e.g., on-line/off-line), general health, alarms, block modes. The first screen graphical user interface 500 provides an extensible platform for providing summary information to a user without having to navigate through a number of user interfaces.

The first screen user interface 500, while initially exposing the contents of an "information tab 502, supports an extensible set of additional tabs—each providing a particular type of information relating to a specified device type template or instance. In the illustrative example, the set of tabs include: system management, network management, diagnostics, and security. Each of these types is described herein below with reference to FIGS. 6-9.

Figure 6:
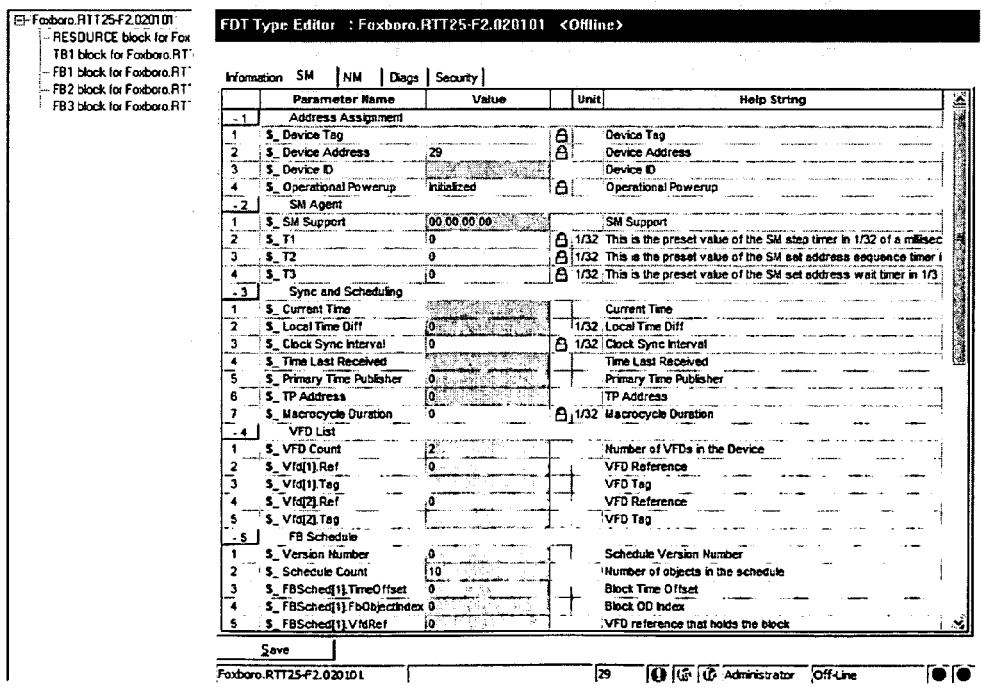
FIG. 6 is an illustrative graphical user interface associated with a system management screen accessed via a tab presented on the device home page.

Turning to FIG. 6, an exemplary system management graphical interface 600 is provided by the customized universal DTM when a user selects the "SM" tab on the first screen graphical user interface 500. The system management graphical interface 600 provides access to a variety of system management parameters associated with the customized universal DTM. Parameters that are changeable in off-line mode include Device ID, Device Tag, Operational Powerup, T1, T2, and T3. The parameters Clock Sync Interval and Macrocycle Duration are only changeable if the device is a configuration master. A link master assigns the Device address, but the user should be able to change it.

Figure 7:
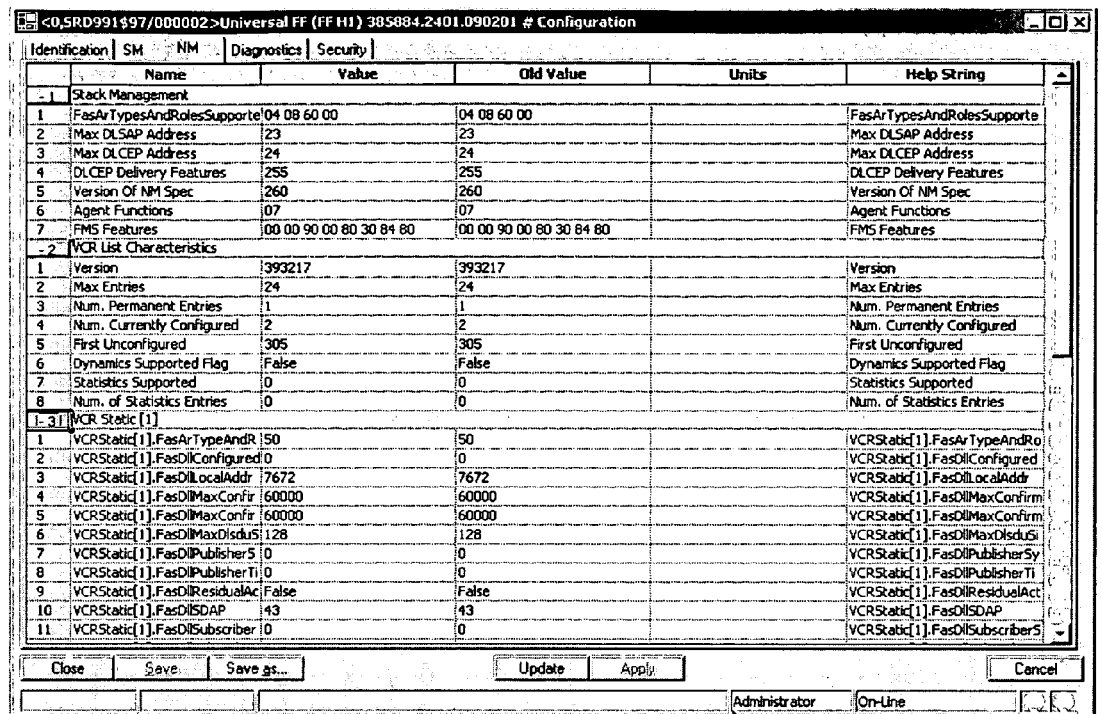
FIG. 7 is an illustrative graphical user interface associated with a network management screen accessed via a tab presented on the device home page.

Turning to FIG. 7, an exemplary network management graphical interface 700 is provided by the customized universal DTM when a user selects the "NM" tab on the first screen graphical user interface 500. The network management graphical interface 700 only displays information relating to the network when connected on-line to an actual field device corresponding to the customized universal DTM operating in association with a field device instance and its associated device information provided by the DD engine 212.

Figure 8:
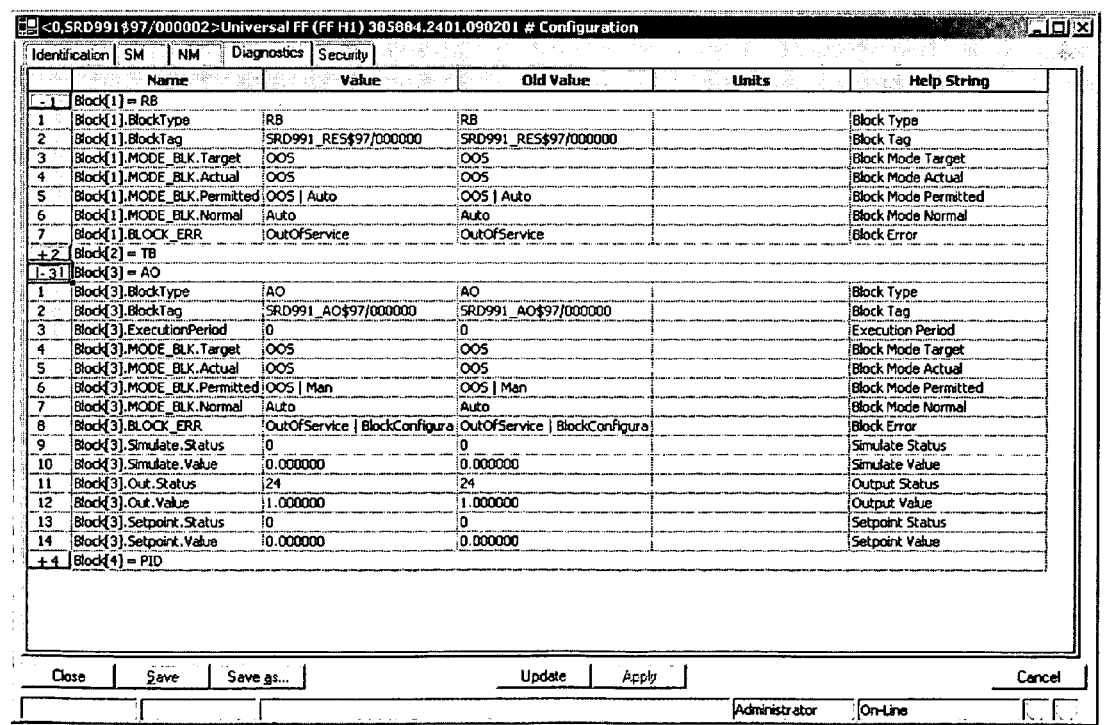
FIG. 8 is an illustrative graphical user interface associated with a diagnostics screen accessed via a tab presented on the device home page.

Turning to FIG. 8, an exemplary diagnostics graphical interface 800 is provided by the customized universal DTM when a user selects the "Diags" tab on the first screen graphical user interface 500. The diagnostic screen, rendered when a user selects the Diags tab, presents the overall status of the device. Like the NM tab, the Diags tab operates in conjunction with an on-line device instance.

The diagnostic interface 800 presents, by way of example, the following:

Device identification information (including Device tag, device ID and device address in the header);

Device communication status (as reported by the system management);

Resource block status including Block_Mode and Block error information;

Transducer Block Status Including Block mode and XD error information;

Function block status including Block mode, Block error and Status and value for the connectable parameters; and Communication statistics information (if supported by the device) In a background task the business object 204 periodically updates dynamic status values from the associated on-line device instance corresponding to the customized universal DTM.

Figure 9:
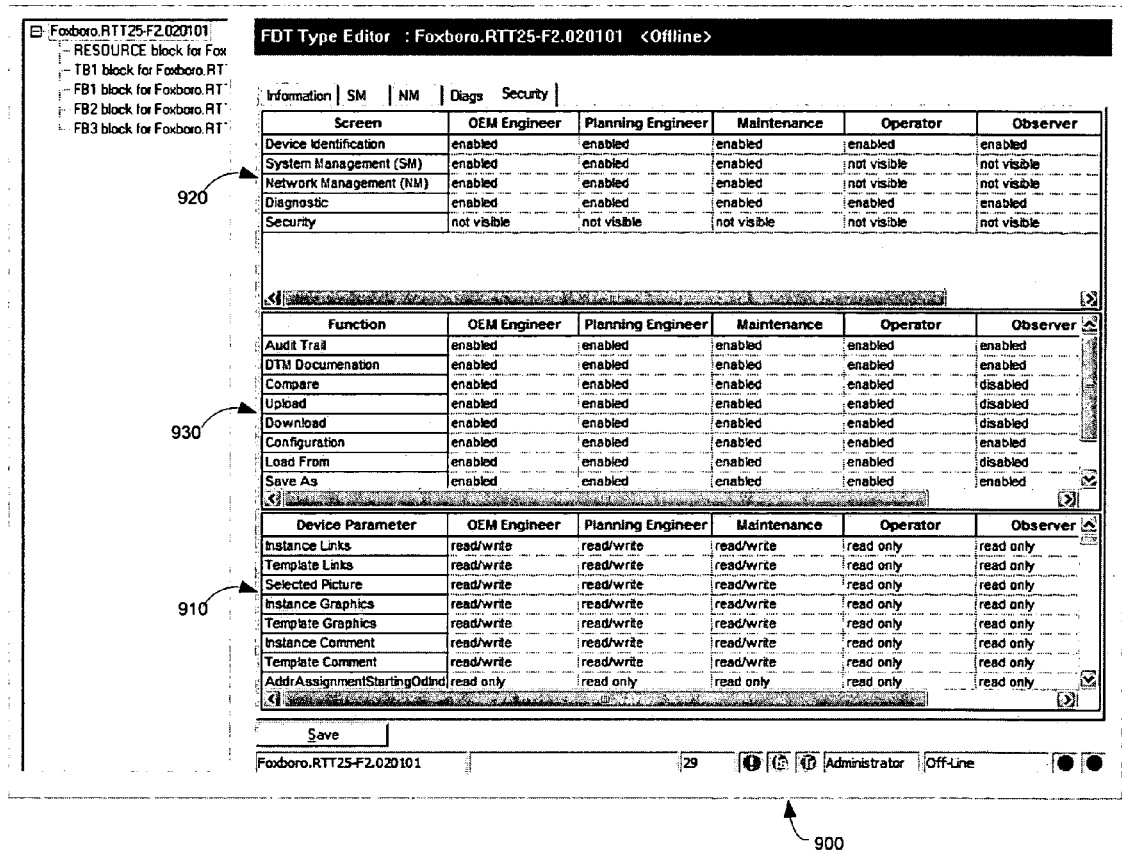
FIG. 9 is an illustrative graphical user interface associated with a security screen accessed via a tab presented on the device home page.

Turning to FIG. 9, an exemplary security graphical interface 900 is provided by the customized universal DTM when a user selects the "Security" tab on the first screen graphical user interface 500. As shown in the security graphical interface 900, the universal DTM 200 supports a set of configurable access levels that are displayed in the form of a parameter permission/modification matrix displayed in the device parameter matrix 910. The matrix 910 comprises a set of cells determining the ability of a set of identified classes of user to read and/or write parameter data associated with the device represented in the customized universal DTM. A Tabs matrix 920 defines user class access to content represented under each of the aforementioned tabs displayed on the first screen as well as each of the graphical user interfaces described herein with reference to FIGS. 5-9. A Functions matrix 930 defines the functions of the customized universal DTM that are accessible to the various user classes identified in the column headings. In the illustrative example, the Functions matrix identifies DD methods that can be invoked by different user classes as defined by their different roles in the project. Each device type can thus be associated with a corresponding permissions matrix.

The above-describe list of tabs is intended to be exemplary in nature. Thus, those skilled in the art will appreciate, in view of this disclosure the potential to add new tabs (either through programming or tool-based customization facilities) addressing other aspects of field device management.

Figure 10:
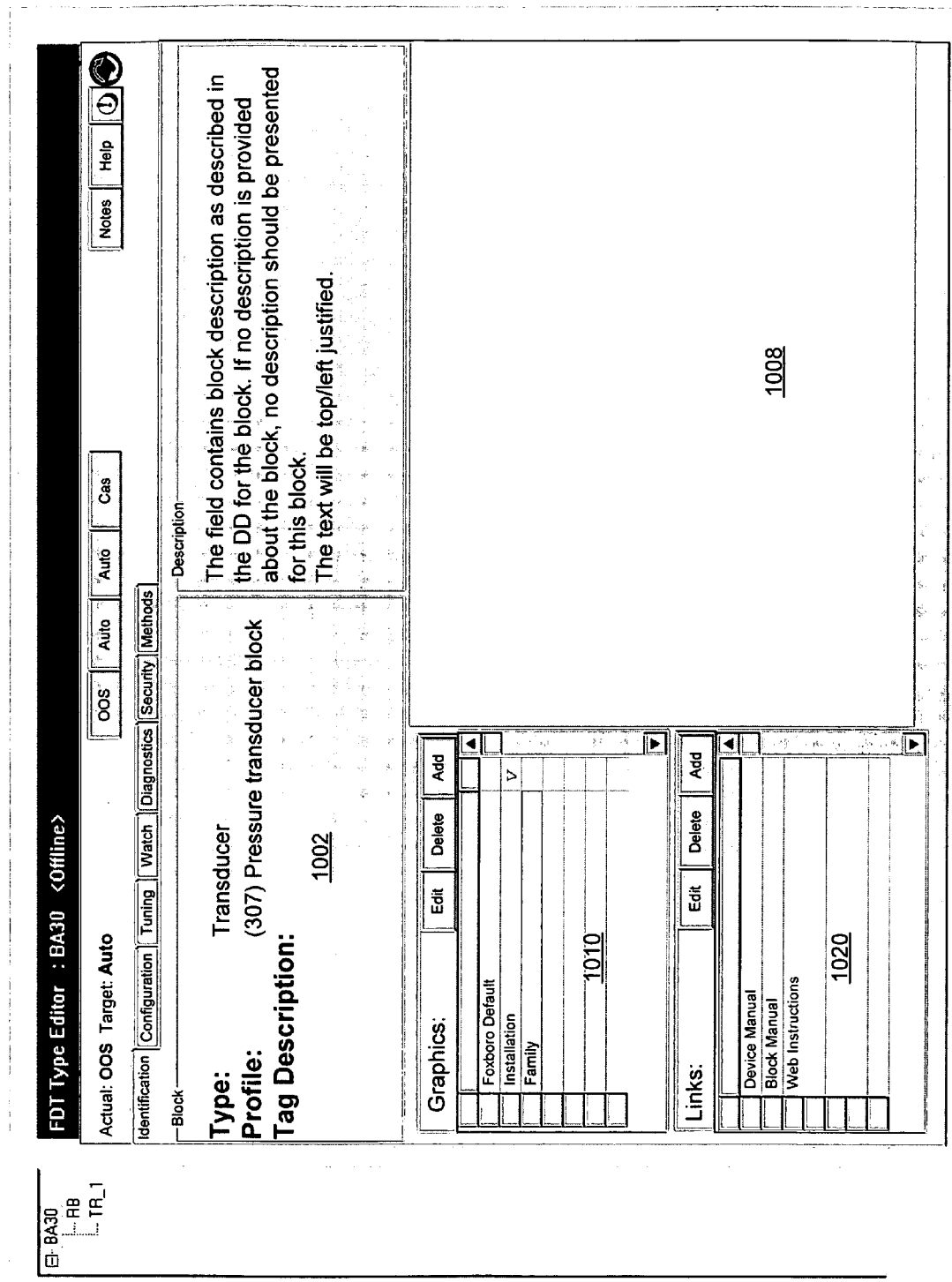
FIG. 10 is an illustrative graphical user interface associated with a block home page rendered by a universal block type manager.

Turning to FIG. 10, an exemplary universal BTM first page 1000 is illustratively depicted (in the present case for a transducer block, TR_1 identified in the device/block tree). The interface contains much of the same information types and functionality described previously hereinabove with reference to the device first page 500. In the case of the universal BTM 210, the home page corresponds to an Identification tab. The associated screen, depicted in FIG. 10, shows information concerning the instance of the block into "Block" section 1002. The Block section 1002 is initially loaded from a block description provided by the DD Engine 212. If the business object 214 is online, then the information is read from the block's parameter 0. The following information is available in this section:

Block type
Profile
Tag Description

A display box 1008 potentially displays any of a variety of graphics displays associated with the specified device type referenced by the universal BTM 210. To enter a reference to a graphic (to be added to a list within a graphics files pane 1010) the user clicks on an Add button. In a resulting popup menu the user selects a File Open option. With a resulting standard File Open Dialog the user navigates through a system directory and selects a file. Afterwards a dialog opens to let the user define whether the graphics should be instance or device type specific. To delete an entry the user selects the appropriate text reference within the graphics files pane 1010 and presses a delete button. To display the information the user selects the reference. The graphics are thereafter rendered in the display box 1008.

A links box 1020 enables a user to enter electronic data links to any of a variety of information sources including URL's, network/file names, etc. referencing documentation in any of a wide variety of formats (e.g., .pdf, .bmp, .rtf, etc.). A user enters a link within the links box 1020 by clicking on an Add Button. In a resulting popup menu the user selects File Open. With a resulting standard File Open Dialog the user navigates through a system directory and selects a file. Afterwards a dialog opens to let the user define whether the linked file/document should be instance or device type specific. To delete an entry the user selects the appropriate text reference within the graphics files pane 1020 and presses a delete button. To display the information the user selects the reference, and the resulting information is rendered in a viewing application that is launched in response to the selection (e.g., a .pdf viewer application).

The GUI for the universal BTM 210 also includes a Configuration tab. Turning to FIG. 11, an exemplary configuration graphical interface 1100 is provided by the customized universal BTM 210 when a user selects the "Configuration" tab. When a configuration screen is displayed, the user is able to specify parameters in the block. A user names and builds configuration entries corresponding to the blocks of a field device by selecting parameters from a list of block parameters. The parameters of each identified block are identified by "parameter name" and current/last known value for the parameter is displayed in an adjacent column. A units column and help column are also included for storing additional information relating to the block parameters.

Turning to FIG. 12, an exemplary tuning graphical interface 1200 is provided by the customized universal BTM 210 when a user selects the "Tuning" tab. The tuning tab interface 1200 combines the characteristics of a "Configuration" tab and a "Watch" tab. The tuning interface 1200 allows a user to modify device parameters. The interface 1200 also displays parameter values within a chart of Block Parameters. The set of parameters are dynamically updated and displayed vertically over time. The tuning interface 1200 allows the user to see the effect of changes made to the parameters in real time. It is thus used for tuning the blocks.

Figure 13:
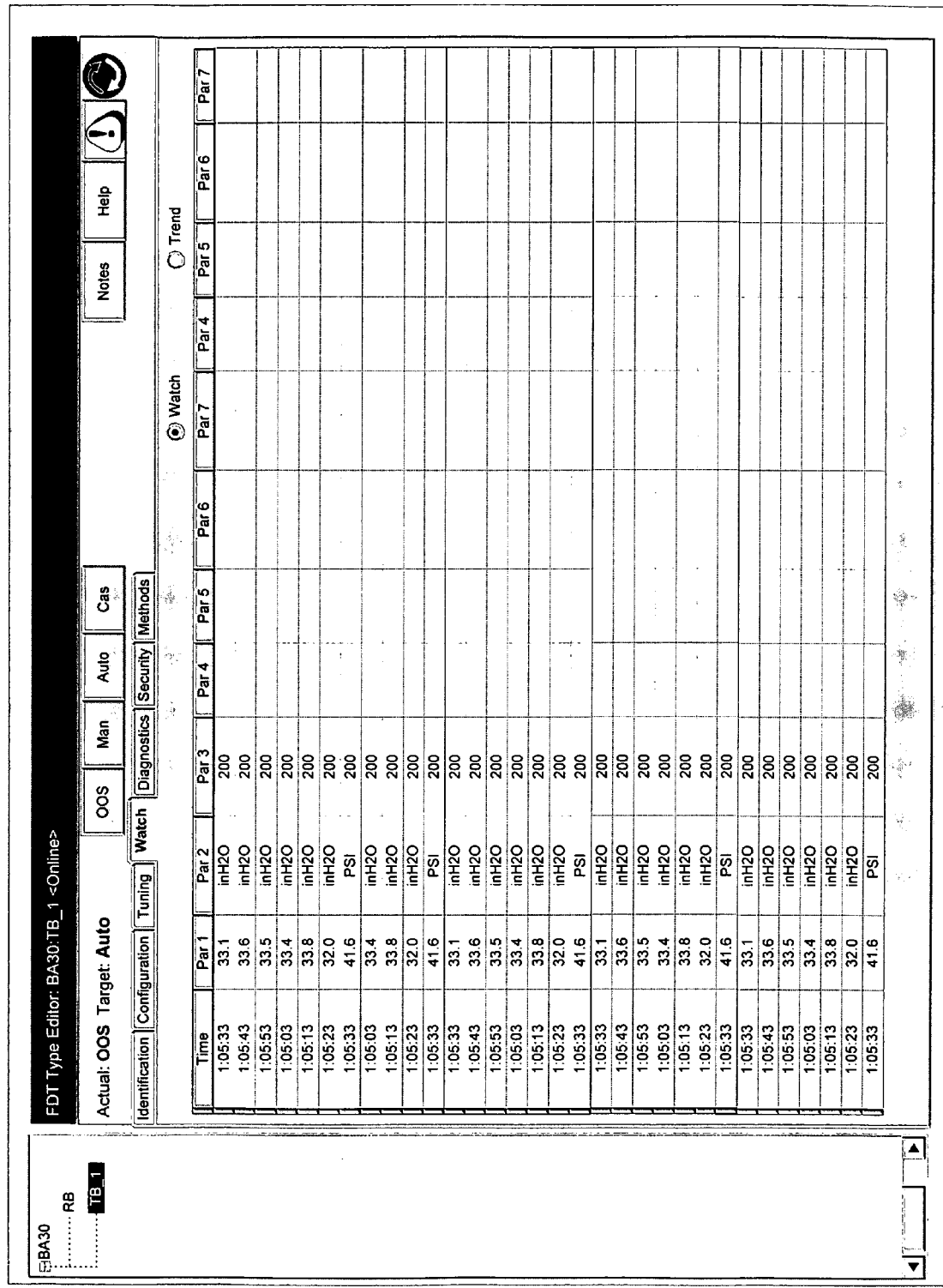
FIG. 13 is an illustrative graphical user interface associated with a watch screen accessed via a tab presented on the universal block type manager interfaces.

Turning to FIG. 13, an exemplary watch graphical interface 1300 is provided by the customized universal BTM 210 when a user selects the "Watch" tab. The watch graphical interface 1300 displays a user defined set of parameters over time. The parameters are dynamically updated in a time sequence. Rather than showing the parameter and the current value it displays the parameter and the value over a span of time. The user can display the parameter values either in a grid (presently shown) or in a graphical plot.

Figure 14:
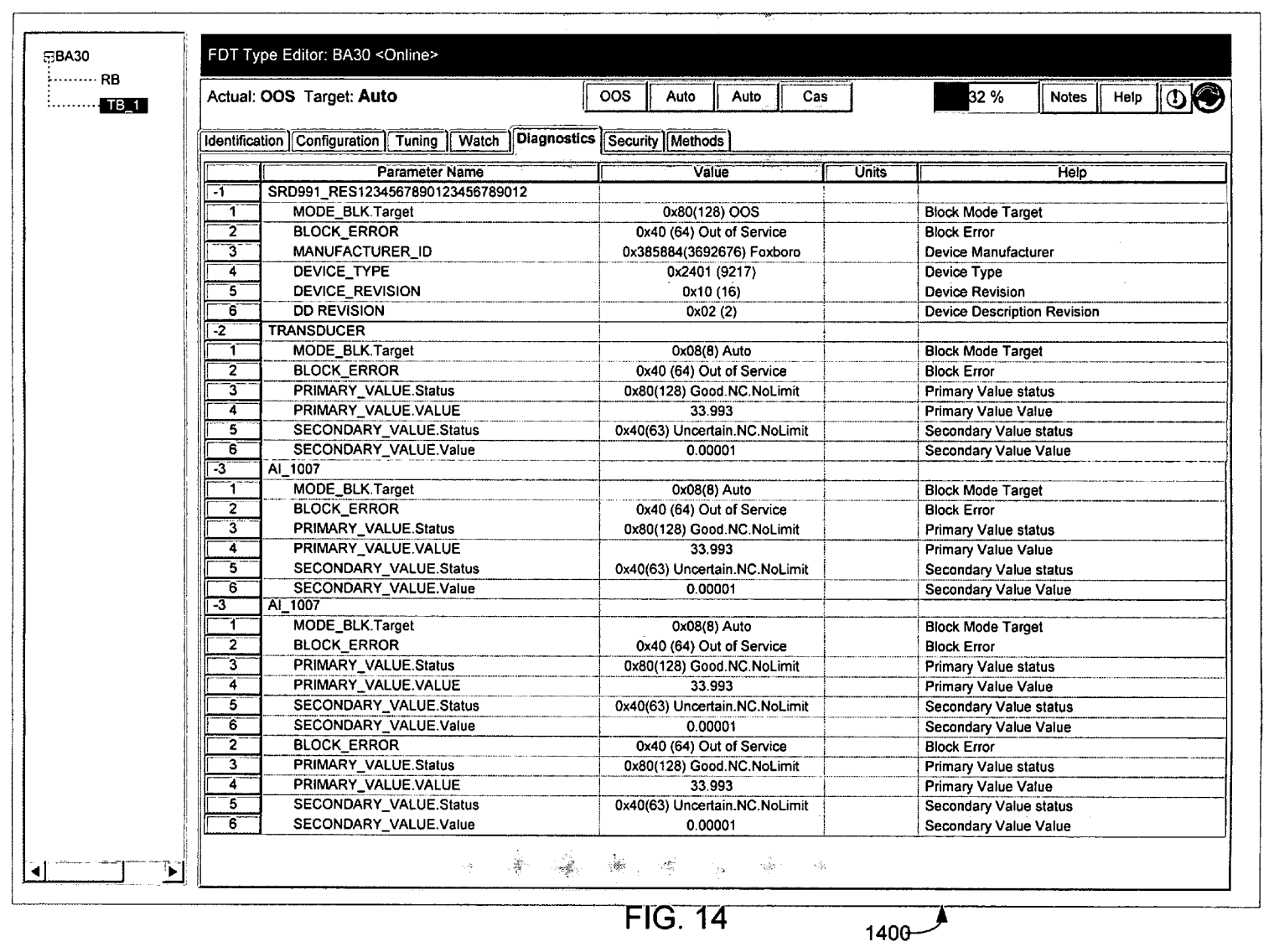

Turning to FIG. 14, an exemplary diagnostics graphical interface 1400 is provided by the customized universal BTM 210 when a user selects the "Diagnostics" tab. The diagnostics graphical interface 1400 displays a user defined set of parameters. The parameter values are dynamically updated. The screen shows the parameter name and the current value for the parameter. The diagnostics graphical interface 1400 screen is thus used to display diagnostic parameters in a device which may be changing over time.

Figure 15:
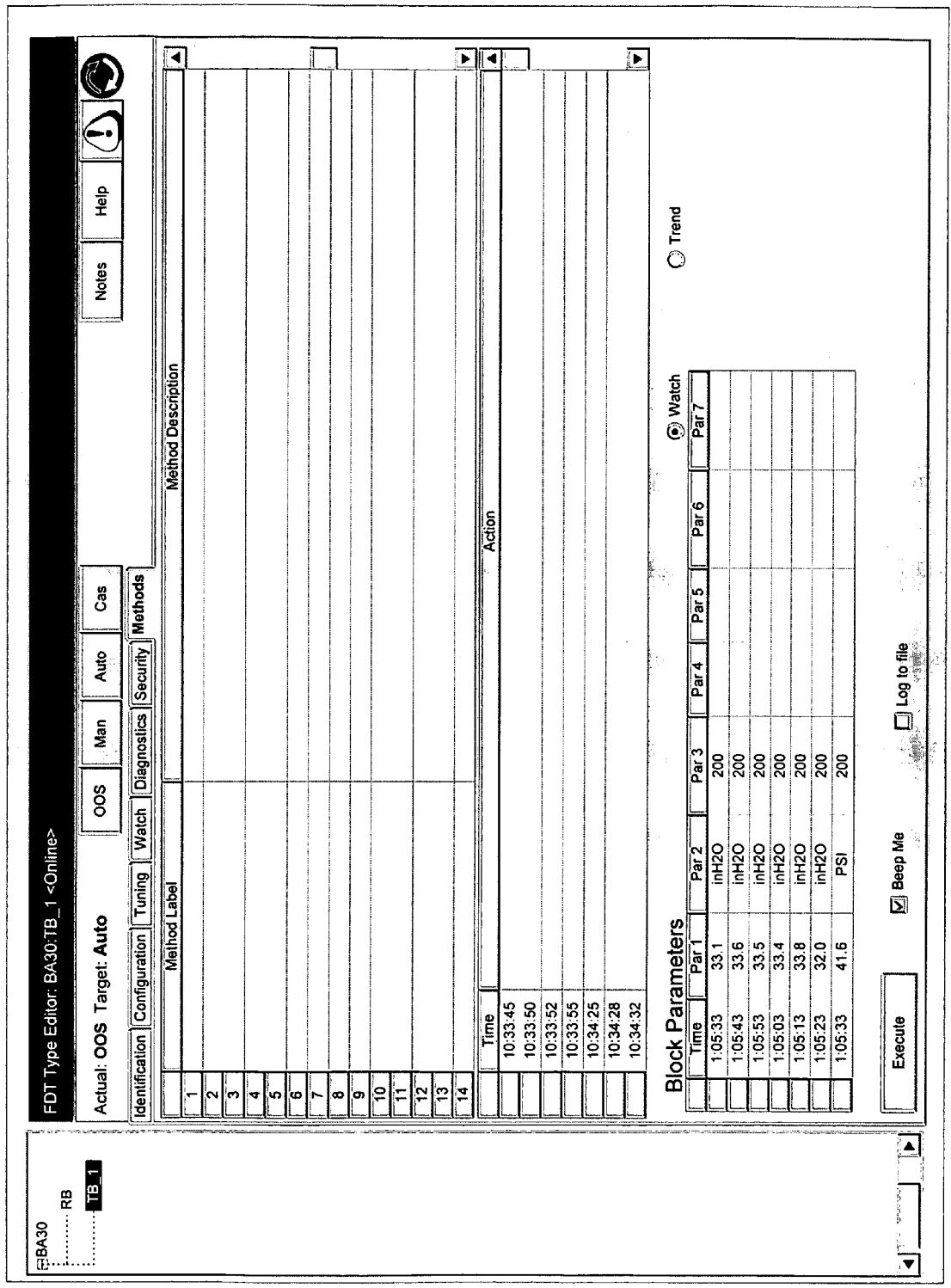
FIG. 15 is an illustrative graphical user interface associated with a methods screen accessed via a tab presented on the universal block type manager interfaces.

Turning to FIG. 15, an exemplary methods graphical interface 1600 is provided by the customized universal BTM 210 when a user selects the "Methods" tab. The device descriptions provided by the vendors, in addition to device parameter definitions, contain methods. The methods are a scripting like language written in device description language. These scripts are written by the device vendor to perform specific functions. The methods graphical interface 1500 shows the methods in the device description file and interacts with the DD Engine 212 to execute the method script.

Turning to FIG. 16, an exemplary security graphical interface 1600 is provided by the customized universal BTM 210 when a user selects the "Security" tab. As shown in the security graphical interface 1600, the universal BTM 210 supports a set of configurable access levels that are displayed in the form of a set of parameter, method, function and screen permission/modification matrices.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention.

While the illustrative embodiments have been directed primarily to FF Device Descriptions, the invention as recited herein below, and in particular the term device description, is intended to be broadly defined to include HART Communication Foundation EDDL, Fieldbus Foundation EDDL, and Profibus International GSD, among others, all collectively referred to herein as device descriptions. Therefore, the invention as described herein contemplates all such embodiments as may come within the scope of the following claims and equivalents thereof.

What is claimed is:

1. A workstation including a computer-readable medium comprising computer executable instructions for providing a utility including a generalized architecture facilitating defining and generating user interfaces associated with managing a variety of field device types, the utility including computer-executable instructions for performing, on the workstation, the steps of:

providing a device description data store interface providing access to a device description store wherein device descriptions for a variety of field device types are maintained, each device description defining a parameter value set for populating parameter value placeholders within device type manager definitions;

providing a device type template store interface to access a set of device type manager definitions; and rendering, by a device type manager engine, on-demand for a designated field device, a device type manager interface providing user access via the workstation to the designated field device based upon:

a device description obtained via the device description data store interface according to a device type of the designated field device, and a device type manager definition obtained via the device type template store interface, wherein parameter values provided by the device description populate parameter value placeholders within the device type manager definition.

2. The workstation of claim 1 wherein the device descriptions are Fieldbus Foundation standard device descriptions.

3. The workstation of claim 1 wherein the device type manager engine comprises a first component supporting underlying user-transparent operations and a second component supporting a set of graphical user interfaces for a selected device type.

4. The workstation of claim 1 wherein the device type manager engine operates upon device type manager definitions associated with object templates.

5. The workstation of claim 4 wherein the object templates support an inheritance hierarchy.

6. The workstation of claim 5 wherein device type manager definitions are associated, at a highest level, with a device type manager definition for a Fieldbus Foundation device.

7. The workstation of claim 1 wherein access to a field device includes access to information, functions and operations associated with the field device.

8. The workstation of claim 1 wherein the device type manager interface is rendered in accordance with device data retrieved from an engineering database in accordance with a user selection of a non-default device type manager.

9. A method for defining and generating, via a generalized architecture, user interfaces associated with managing a variety of field device types having associated standard device descriptions, the method comprising the steps of:

retrieving a device description from a device description store wherein device descriptions for a variety of field device types are maintained, each device description defining a parameter value set for populating parameter value placeholders within device type manager definitions;

retrieving a device type manager definition from a device type template store comprising a set of device type manager definitions; and rendering, by a device type manager engine, on demand for a designated field device, a device type manager interface providing user access via a workstation to the designated field device based upon:

a device description obtained from the device description data store according to a device type of the designated field device, and a device type manager definition obtained from the device type template store, wherein parameter values provided by the device description populate parameter value placeholders within the device type manager definition.

10. The method of claim 9 wherein the device descriptions are Fieldbus Foundation standard device descriptions.

11. The method of claim 9 wherein the device type manager engine comprises a first component supporting underlying user-transparent operations and a second component supporting a set of graphical user interfaces for a selected device type.

12. The method of claim 9 wherein the device type manager engine operates upon device type manager definitions associated with device object templates.

13. The method of claim 12 wherein the device object templates support an inheritance hierarchy.

14. The method of claim 9 wherein access to a field device includes access to information, functions and operations associated with the field device.

15. The method of claim 9 wherein the device type manager definition comprises a set of data for modifying a default customized device type manager corresponding to the retrieved device description.

16. The method of claim 9 wherein the device type manager interface is rendered in accordance with device data retrieved from an engineering database in accordance with a user selection of a non-default device type manager.

17. A non-transitory computer-readable medium including computer-executable instructions facilitating defining and generating, via a generalized architecture, user interfaces associated with managing a variety of field device types having associated standard device descriptions, the computer-executable instructions facilitating performing the steps of:

retrieving a device description from a device description store wherein device descriptions for a variety of field device types are maintained, each device description defining a parameter value set for populating parameter value placeholders within device type manager definitions;

retrieving a device type manager definition from a device type template store comprising a set of device type manager definitions; and rendering, by a device type manager engine, on demand for a designated field device, a device type manager interface providing user access via a workstation to the designated field device based upon:

a device description obtained from the device description data store according to a device type of the designated field device, and a device type manager definition obtained from the device type template store, wherein parameter values provided by the device description populate parameter value placeholders within the device type manager definition.

18. The non-transitory computer-readable medium of claim 17 wherein the device descriptions are Fieldbus Foundation standard device descriptions.

19. The non-transitory computer-readable medium of claim 17 wherein the device type manager engine comprises a first component supporting underlying user-transparent operations and a second component supporting a set of graphical user interfaces for a selected device type.

20. The non-transitory computer-readable medium of claim 17 wherein the device type manager engine operates upon device type manager definitions associated with device object templates.

21. The non-transitory computer-readable medium of claim 17 wherein access to a field device includes access to information, functions and operations associated with the field device.

22. The non-transitory computer-readable medium of claim 17 wherein the device type manager definition comprises a set of data for modifying a default customized device type manager corresponding to the retrieved device description.

23. The non-transitory computer-readable medium of claim 17 wherein the device type manager interface is rendered in accordance with device data retrieved from an engineering database in accordance with a user selection.

* * * * *